US006483095B1

(12) United States Patent
Iwaki

(10) Patent No.: US 6,483,095 B1
(45) Date of Patent: Nov. 19, 2002

(54) LIGHT-TRANSMITTING OBJECT IDENTIFYING APPARATUS AND METHOD

(75) Inventor: Kunihide Iwaki, Yokohama (JP)

(73) Assignee: Yokohama Denshi Kogyo Kabushiki Kaisha, Kanagawa-ken (JP)

( * ) Notice: Subject to any disclaimer, the term of this patent is extended or adjusted under 35 U.S.C. 154(b) by 0 days.

(21) Appl. No.: 09/573,383

(22) Filed: May 18, 2000

(30) Foreign Application Priority Data

May 28, 1999 (JP) .......................................... 11-150110

(51) Int. Cl.[7] ............................ G06K 11/00; G01J 1/32

(52) U.S. Cl. .................. 250/214 R; 250/556; 250/205; 356/71

(58) Field of Search ......................... 250/214 R, 214 A, 250/214 LS, 214 L, 556, 223 R, 205; 356/71; 209/534; 194/207; 382/135

(56) References Cited

U.S. PATENT DOCUMENTS

| | | | | |
|---|---|---|---|---|
| 4,587,434 A | | 5/1986 | Roes et al. | |
| 4,618,257 A | | 10/1986 | Bayne et al. | |
| 4,769,532 A | | 9/1988 | Kawakami | |
| 6,050,387 A | * | 4/2000 | Iwaki | 250/205 |

FOREIGN PATENT DOCUMENTS

| | | |
|---|---|---|
| JP | 54-066894 | 5/1979 |
| JP | 62-111377 | 5/1987 |
| JP | 11-86073 | 3/1999 |

* cited by examiner

*Primary Examiner*—Kevin Pyo
(74) *Attorney, Agent, or Firm*—Merchant & Gould P.C.

(57) ABSTRACT

In order to provide an apparatus which has a simple arrangement, can be easily adjusted, and can authenticate a bill, negotiable instrument, and the like with high reliability, adjustment is performed in advance in the absence of an identification target to equalize outputs from a photoelectric converter with respect to light sources A and B that emit light beams having different wavelengths. In this state, the difference in output between detection signals based on the light beams transmitted through an identification target is detected as an output from a high-pass filter. A sampling circuit samples a signal proportional to the difference in output between the detection values based on the light sources A and B, which is based on this output difference. Authentication is performed on the basis of the sampled value. A deterioration in the light sources is suppressed by periodically setting the interval during which only emission is stopped while the adjusted level is held in the absence of an identification target, instead of continuing adjustment by always causing the light sources A and B to alternately emit light beams.

6 Claims, 27 Drawing Sheets

| Sb \ Sa | 0 | 1 |
|---|---|---|
| 0 | Aoff Boff | Aoff Boff |
| 1 | Aoff Bon | Aoff Bon |

FIG. 5A

FIXED EMISSION ( DETECTION MODE )

| | Sa | | Sb | F | | T | | |
|---|---|---|---|---|---|---|---|---|
| DD1 | 1 | | 0 | 1 | | * | | |
| DD2 | 0 | | 1 | 1 | | * | | |

* : DON'T CARE
SET :
F = 0 : LIGHT AMOUNT CAN BE CHANGED
F = 1 : LIGHT AMOUNT IS FIXED

FIG. 5B

ADJUSTMENT EMISSION ( STANDBY ADJUSTMENT MODE, PRE-DETECTION ADJUSTMENT MODE )

| | Sa | | Sb | F | | T | | |
|---|---|---|---|---|---|---|---|---|
| DD1 | 1 | | 0 | 0 | | SET | | |
| DD2 | 0 | | 1 | 0 | | SET | | |

* : DON'T CARE
SET :
F = 0 : LIGHT AMOUNT CAN BE CHANGED
F = 1 : LIGHT AMOUNT IS FIXED

FIG. 5C

NON-EMISSION ( STANDBY HOLD MODE )

| | Sa | | Sb | F | | T | | |
|---|---|---|---|---|---|---|---|---|
| DD1 | 0 | | 0 | 1 | | * | | |
| DD2 | 0 | | 0 | 1 | | * | | |

* : DON'T CARE
SET :
F = 0 : LIGHT AMOUNT CAN BE CHANGED
F = 1 : LIGHT AMOUNT IS FIXED

FIG. 8

SWITCHING CONTROL TABLE

| MODE \ SET VALUE | INITIAL VALUE Mci | PRESET 1 Mp1 | PRESET 2 Mp2 |
|---|---|---|---|
| STANDBY HOLD | 40000 | | 48000 |
| DETECTION | 0 | | 8000 |
| PRE-DETECTION ADJUSTMENT | 10000 | 10030 | 10060 |
| STANDBY ADJUSTMENT | 20000 | 20030 | 20060 |
| INITIALIZATION ADJUSTMENT | 30000 | 34000 | 38000 |
| DISCHARGE | 50000 | | 58000 |

FIG. 19A

FIXED EMISSION ( DETECTION MODE )

| | Sa1 | Sa2 | Sb | Fa2 | Fb | T | | |
|---|---|---|---|---|---|---|---|---|
| DD1 | 1 | 1 | 0 | 1 | 1 | * | | |
| DD2 | 0 | 0 | 1 | 1 | 1 | * | | |

* : DON'T CARE
SET :
F = 0 : LIGHT AMOUNT CAN BE CHANGED
F = 1 : LIGHT AMOUNT IS FIXED

FIG. 19B

ADJUSTMENT EMISSION 1 ( STANDBY ADJUSTMENT MODE, PRE-DETECTION ADJUSTMENT MODE )

| | Sa1 | Sa2 | Sb | Fa2 | Fb | T | | |
|---|---|---|---|---|---|---|---|---|
| DD1 | 1 | 0 | 0 | 0 | 1 | SET | | |
| DD2 | 0 | 1 | 0 | 0 | 1 | SET | | |

* : DON'T CARE
SET :
F = 0 : LIGHT AMOUNT CAN BE CHANGED
F = 1 : LIGHT AMOUNT IS FIXED

FIG. 19C

ADJUSTMENT EMISSION 2 ( STANDBY ADJUSTMENT MODE, PRE-DETECTION ADJUSTMENT MODE )

| | Sa1 | Sa2 | Sb | Fa2 | Fb | T | | |
|---|---|---|---|---|---|---|---|---|
| DD1 | 1 | 1 | 0 | 1 | 0 | SET | | |
| DD2 | 0 | 0 | 1 | 1 | 0 | SET | | |

* : DON'T CARE
SET :
F = 0 : LIGHT AMOUNT CAN BE CHANGED
F = 1 : LIGHT AMOUNT IS FIXED

FIG. 19D

NON-EMISSION ( STANDBY HOLD MODE )

| | Sa1 | Sa2 | Sb | Fa2 | Fb | T | | |
|---|---|---|---|---|---|---|---|---|
| DD1 | 0 | 0 | 0 | 1 | 1 | * | | |
| DD2 | 0 | 0 | 0 | 1 | 1 | * | | |

* : DON'T CARE
SET :
F = 0 : LIGHT AMOUNT CAN BE CHANGED
F = 1 : LIGHT AMOUNT IS FIXED

LIGHT-TRANSMITTING OBJECT IDENTIFYING APPARATUS AND METHOD

FIELD OF THE INVENTION

The present invention relates to a light-transmitting object identifying apparatus and method which can easily authenticate a light-transmitting object.

BACKGROUND OF THE INVENTION

Recent years have seen the remarkable widespread use of various types of vending machines targeted for a wide variety of merchandise. Some vending machines allow the use of bills, specific prepaid cards, and the like in addition to coins. Vending machines are installed in various places, and hence operate in various operation conditions. These machines are therefore required to exhibit satisfactory performance in every operation environment. This applies to mechanisms for authenticating coins, bills, and the like.

For example, the authenticity of a coin can be checked by examining its weight and shape, and hence a coin identifying mechanism can be mechanically formed.

In contrast to this, it is almost impossible to identify a bill with a mechanical device. For this reason, the degree of transmittance of a bill is optically discriminated. In a conventional bill discrimination method, a light source and a light-receiving element are spaced apart from each other by a predetermined distance, and a bill is conveyed between them to detect a light and dark pattern unique to the light source. The detected pattern is then compared with a reference light and dark pattern held in advance, thereby authenticating the bill.

In this method, however, since authentication is performed based on only light and dark patterns, even a copy of a negotiable instrument may be easily identified as a bill.

In order to solve this problem, a color sensor may be used. However, a color sensor is expensive and demands complicated signal processing, and hence cannot be used for a vending machine or the like which must meet a requirement for low cost as an absolute necessity.

In addition, a white light source (incandescent lamp) must be used as a light source. The white light source has a short service life, and burns out in a short period of time when the ambient temperature becomes high as in a case wherein the machine is installed on a road under the hot sun. In such a case, even if a bill is inserted into the vending machine, the bill is determined as a counterfeit and rejected.

In order to overcome this drawback, the color appearance of a bill may be determined by using, for example, two light-emitting diodes for emitting light beams having different wavelengths as light sources and receiving the light beams from the light-emitting diodes with one light-receiving element. Light-emitting diodes, however, vary in luminous efficacy. For this reason, the driving currents to the light-emitting diodes must be adjusted to equalize the performance ratios.

In addition, it is difficult to maintain uniform strength ratio for vending machines that can be installed outdoor because environmental conditions greatly vary. This equally applies to light-receiving elements. For this reason, reliable identification results cannot be obtained, and such vending machines are difficult to actually use.

In order to overcome such a drawback, a technique of using two light-emitting diodes, i.e., green and red light-emitting diodes, is disclosed in Japanese Patent Laid-Open No. 54-066894. In this technique, light beams emitted from the two light-emitting diodes are received by one light-receiving element, and the two light-emitting diodes are controlled to emit light beams in the same amount when there is no bill between the light-emitting diodes and the light-receiving element. When a bill comes between the light-emitting diodes the light-receiving element, an error signal is output in either of the two cases, i.e., a case wherein the output of the green light-emitting diode becomes equal to or higher than a reference level (the color of the bill is offset to green to some extent) and a case wherein the output of the red light-receiving element become equal to or higher than a reference level (the color of the bill is offset to red to some extent).

The technique disclosed in Japanese Patent Laid-Open No. 54-066894 is, however, based on the assumption that "when the color of a bill does not shift (offset) to red or green, the amount of light received by the light-receiving element, i.e., the output, is at zero level as in the case of the absence of a bill". In identifying such a bill, according to this technique, an error can only be determined when the color of the bill is offset to green or red to some extent. Some effect can be expected from this technique when a bill is printed in a specific color. If, however, bills are printed in full color as in Japan, it is almost impossible to authenticate bills by using the above technique.

If, for example, a bill is printed or copied in monochrome, no error can be determined. In practice, therefore, this technique cannot be used.

Furthermore, the service life of a light-emitting diode is inversely proportional to the emission time to a certain degree. If, therefore, the emission time of the light-emitting diode is too long, the diode deteriorates, resulting in a deterioration in identification performance. This is the problem that must be overcome by all means. That is, a deterioration in light-emitting diode needs to be suppressed.

SUMMARY OF THE INVENTION

The present invention has been made to solve the above problems, and has as its object to provide a light-transmitting object identifying apparatus which can automatically solve problems associated with variations in performance of each constituent members of a mechanism for detecting an identification object, changes in performance over time, and changes in performance due to environments with a simple arrangement, can be easily manufactured and adjusted, and has high reliability.

It is another object of the present invention to provide a light-transmitting object identifying apparatus which can express the difference in color taste between an authentic object and an identification target as a single signal with respect to the identification target, and can perform reliable authentication using a simple algorithm.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 5A to 5C are views showing control data DD1 and DD2 for the output port of a CPU which outputs light source control signals according to the first embodiment;

FIG. 8 is a view showing an example of a switching control table in the first embodiment;

FIGS. 19A to 19D are views showing control data DD1 and DD2 for the output port of a CPU which outputs light source control signals in the second embodiment;

DETAILED DESCRIPTION OF THE PREFERRED EMBODIMENTS

Embodiments of the present invention will be described in detail with reference to the accompanying drawings. The following description is about a light-transmitting object identifying apparatus capable of easily authenticating a light-transmitting object as an identification target. For example, a negotiable instrument identifying apparatus for authenticating a negotiable instrument (or bill) as an example of an identification target will be described below.

[First Embodiment]

Figure 1:
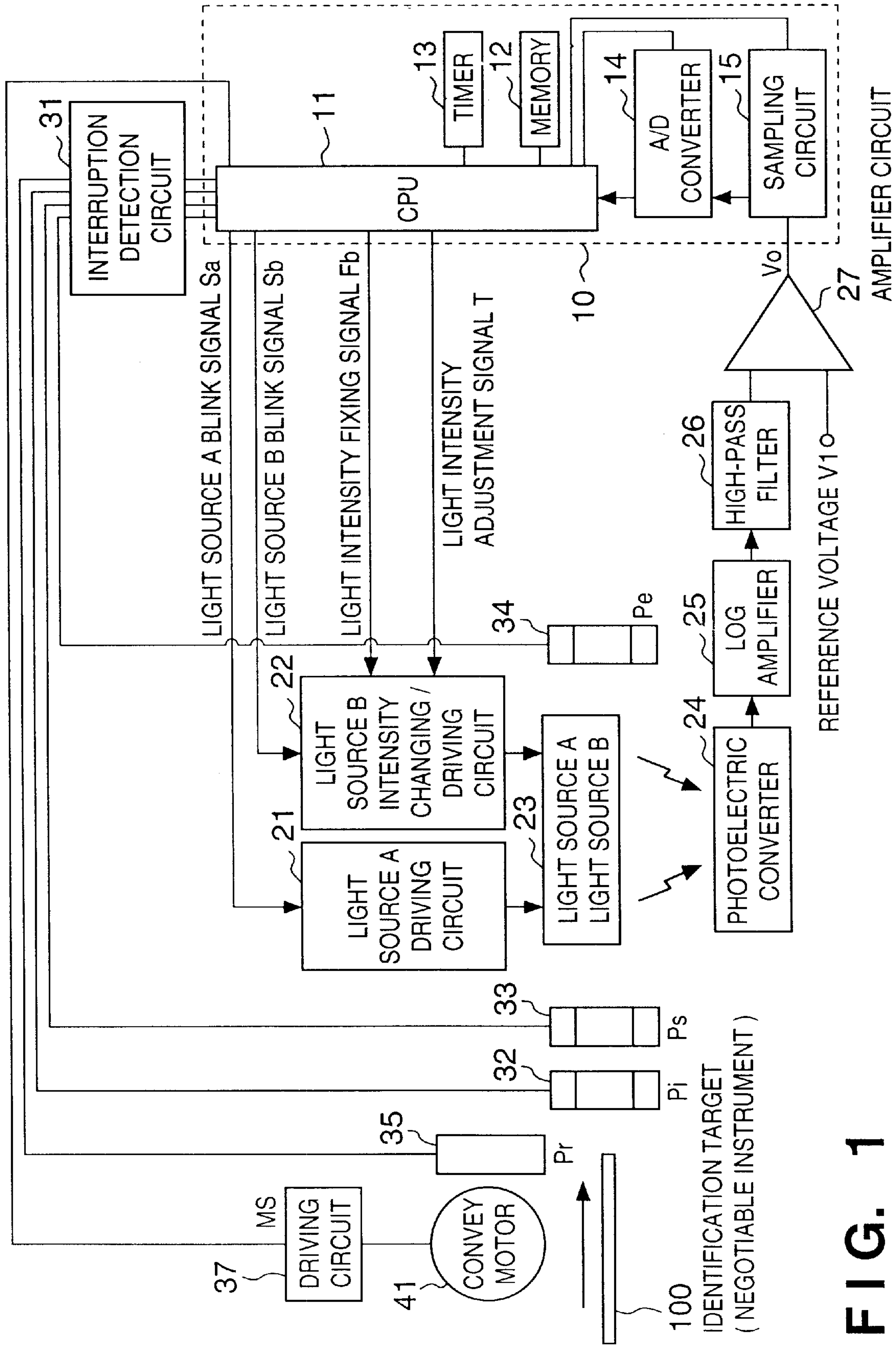
FIG. 1 is a block diagram showing the arrangement of a negotiable instrument identifying apparatus according to the first embodiment of the present invention.
Figure 2:
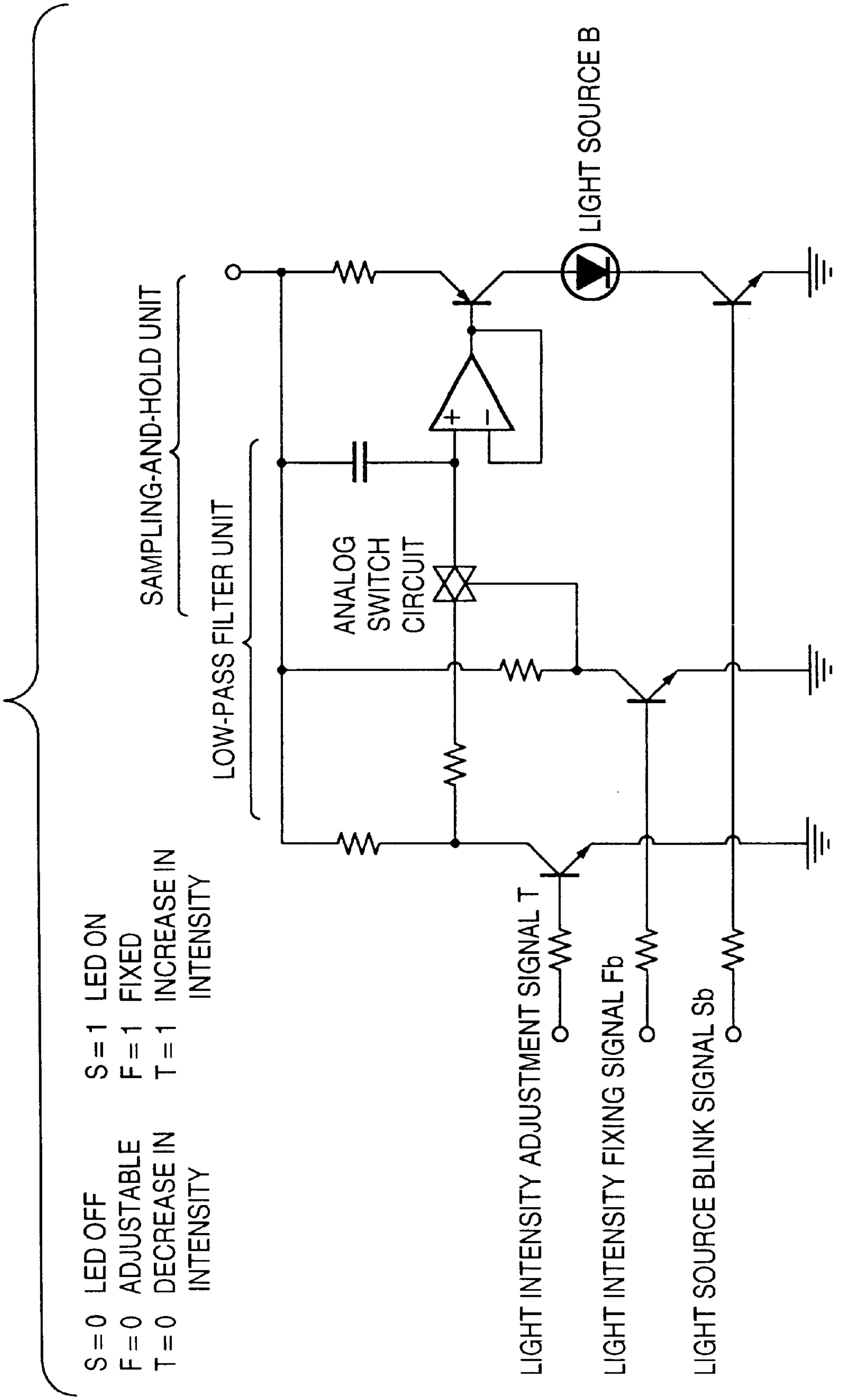
FIG. 2 is a circuit diagram showing the detailed arrangement of a light source B intensity changing/driving circuit serving as an automatic light source emission intensity adjusting circuit in FIG. 1.
Figure 3:
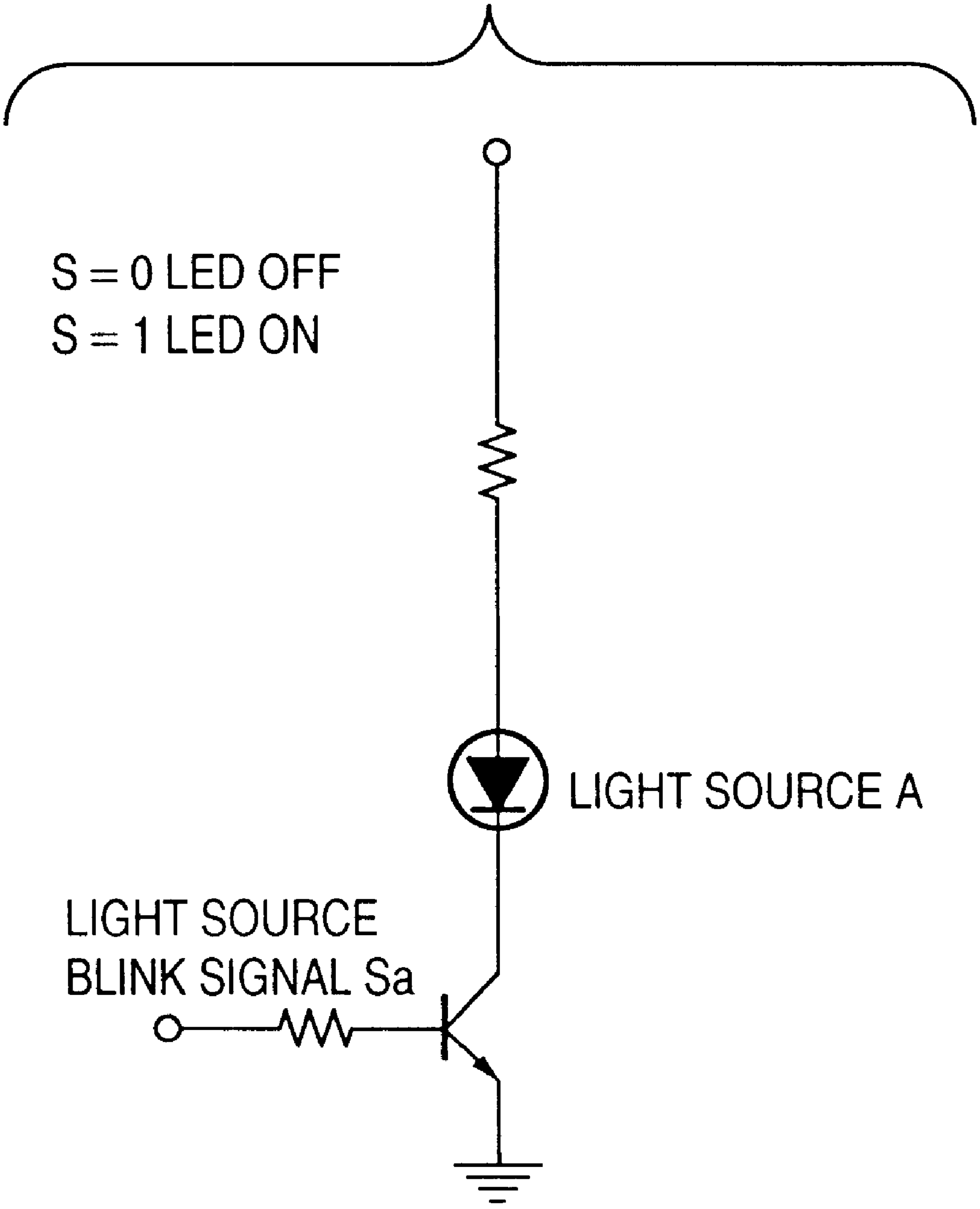
FIG. 3 is a circuit diagram showing the detailed arrangement of a light source A driving circuit in FIG. 1.
Figure 4:
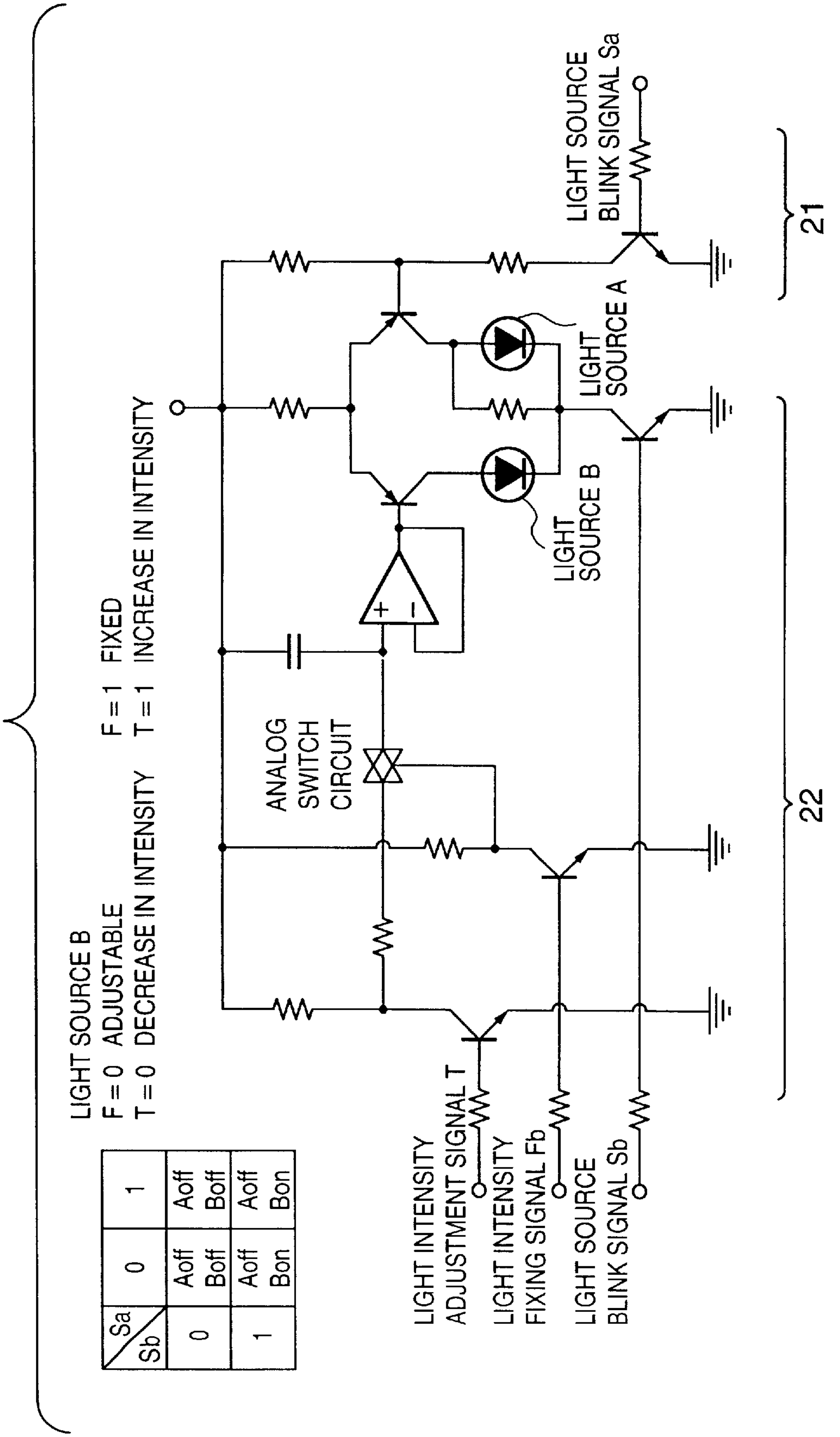
FIG. 4 is a circuit diagram showing the arrangement of a light source emission changing/driving circuit to be used when light sources A and B in FIG. 1 are formed by cathode-common two-color LEDs.

FIG. 1 shows the arrangement of a negotiable instrument identifying apparatus according to an embodiment of the present invention. FIG. 2 shows the detailed circuit arrangement of a light source B intensity changing/driving circuit as an automatic light source emission intensity adjusting circuit in FIG. 1. FIG. 3 shows the detailed circuit arrangement of a light source A driving circuit in FIG. 1. FIG. 4 shows the arrangement of a light source emission changing/driving circuit in a case wherein the light sources A and B are formed by using cathode common two-color LEDs.

Referring to FIG. 1, reference numeral 10 denotes a control unit for controlling the overall negotiable instrument identifying apparatus of this embodiment. The control unit 10 is comprised of a CPU 11 for performing various control operations in accordance with control procedures that are stored in, for example, a memory 12 and indicated by the flow charts to be described later, the memory 12 storing control programs for the CPU 11 and the like, a timer 13 for performing time control, an A/D converter 14 for converting an input analog signal into a corresponding digital signal, and a sampling circuit 15 for sampling an analog signal input through an input port.

According to this embodiment, in the control unit 10, the CPU 11 outputs light source control data DD2 as light source control signals (Sa, Sb, Fb, and T) upon detection of a first half end signal UD1 from the timer 13, and outputs DD1 upon detection of UD2. Upon detection of an A/D conversion start signal ADT, the CPU 11 controls the sampling circuit 15 and A/D converter 14 to start A/D conversion.

As a consequence, different light source driving states based on DD1 and DD2 alternately occur at a predetermined duty ratio, and a light-reception output can always be sampled and loaded into the CPU 11 at a predetermined time point in each cycle.

Reference numeral 21 denotes a light source A driving circuit for performing blink control on the light source A in accordance with a light source A blink signal Sa; and 22, a light source B intensity changing/driving circuit serving as an automatic emission intensity adjusting circuit for the light source B, which performs blink control on the light source B in accordance with a light source B blink signal Sb from the control unit 10, adjusts the emission intensity of the light source B in accordance with a light intensity adjustment signal T, and holds an adjusted state by stopping light intensity adjustment when a light intensity fixing signal Fb is output.

Reference numeral 23 denotes a light source A/light source B capable of emitting light beams having different wavelengths. Obviously, the light source A and light source B may be separate light-emitting elements, or may be a composite light source formed by integrating two light sources.

Reference numeral 24 denotes a photoelectric converter for receiving light from the light source A/light source B 23 or light transmitted through an identification target 100, converting the received light into an electrical signal corresponding to the amount of light received, and outputting the signal, and it can be formed by using photodiode and the like.

Reference numeral 25 denotes a log amplifier for amplifying the electrical signal from the photoelectric converter 24.

In this embodiment of the present invention, a light-reception signal value from the photoelectric converter 24 is amplified by the log amplifier 25 for the following reason. If a linear amplifier is used, an output from the linear amplifier always contains absolute value components of emission intensity. When, therefore, a linear amplifier is used, offsets associated with absolute value components of emission intensity, e.g., variations in the distance between the light source and the photoelectric converter, emission intensity, light-reception intensity, and the like, temperature characteristics, deterioration, and the like, cannot be basically removed. In contrast to this, when a log amplifier is used, an output associated with only the properties of an identification target can be obtained. In addition, since a method of obtaining the difference in output between identical log amplifiers. Is cancellation and the like unique to log amplifiers need not be performed, the arrangement of a log amplifier itself can be simplified.

Letting Ma and Mb be the emission intensities of the light sources A and B, and N be a common steady background, when a linear amplifier is used, $$V\ (Ma+N)-(Mb+N)=Ma-Mb$$

When a log amplifier is used, $$V\ \ln(Ma+N)-\ln(Mb+N)=\ln\{(Ma+N)/(Mb+N)\}$$

Assume that each emission intensity is automatically adjusted to set the peak value to "0". In this case, if a linear amplifier is used, $$Ma-Mb=0\ \ldots\ \therefore Ma=Mb$$

When a log amplifier is used, $$(Ma+N)/(Mb+N)=1\ \ldots\ \therefore Ma=Mb$$

As a consequence, the emission conditions in the above two cases become the same.

In the above condition Ma=Mb ($\equiv$C), if an identification target exhibiting transmittances a and b with respect to light beams from the two light sources 23 is present between the light source A and light source B and the photoelectric converter 24, a peak value V is given by $$V\ a\cdot Ma-b\cdot Mb=(a-b)C$$

when a linear amplifier is used. In this case, the output contains an absolute value component C of emission intensity. When a log amplifier is used, $$V\ \ln\{(a\cdot C+N)/(b\cdot C+N)\}$$

Under the condition of a·C, b·C>>N (N may not be steady), the following output can be approximately obtained;

$$V\ \ln\{(a\cdot C)/(b\cdot C)\}=\ln(a/b)$$

The output representing only the properties of the identification target can be obtained with some conditions. For this reason, this embodiment of the present invention uses a log amplifier.

Reference numeral 26 denotes a high-pass filter for removing components having frequencies less than the light source driving frequency (DC components and fluctuation components associated with brightness which are produced between the DC components and the light source driving frequency) from a detection electrical signal from the log amplifier 25; and 27, an amplifier circuit for superimposing a DC voltage V1 as a reference on the output from the high-pass filter 26, and outputting the resultant voltage.

Reference numeral 31 denotes an interruption detection circuit for detecting an identification target. The interruption detection circuit 31 drives sensors, wave-shapes detection signals, and outputs the resultant signals to the control unit 10. The control unit 10 detects the position of the identification target 100 on the basis of detection signals Rck from identification target sensors 32, 33, and 34 and rotation sensor (Pr) 35.

The input sensor (Pi) 32 detects the insertion of the identification target 100. The identification start sensor (Ps) 33 detects a reference for the position of the identification target 100 and also detects that the identification target 100 reaches the installation position (detection area) of the light source 23 and photoelectric converter 24. The pass sensor 34 detects that the identification target 100 passes through the installation position of the light source 23 and photoelectric converter 24 and moves outside the detection area.

The rotation sensor (pr) 35 detects the rotation amount of a convey motor 41 (the convey amount of the identification target 100). The rotation sensor (pr) 35 detects pulses Rck for the rotation amount of the convey motor 41. These sensors 32 to 35 can be formed by using photointerrupters and the like.

Reference numeral 37 denotes a driving circuit for the convey motor 41. The driving circuit 37 drives the convey motor 41 in accordance with a motor switch signal Ms from the CPU 11 of the control unit 10. The convey motor 41 conveys the identification target 100.

The identification target 100 includes an arbitrary object through which light is partly transmitted. In this embodiment, a convey unit is designed for a sheet-like object as a target. However, an identification target having an arbitrary shape can identified by only changing the structure of the convey unit.

In this embodiment described above, the control unit 10 is formed by using, for example, a one-chip microcomputer, which is connected to an external unit through an I/O port to simplify the hardware arrangement. If the control unit is designed to directly A/D-convert a sampled value of an AC output signal and load it as data into an identifying unit formed by the CPU 11, in particular, the circuit can be simplified.

The control unit 10 in this embodiment performs authentication as follows. The photoelectric converter 24 is adjusted in advance such that the same output signal is obtained with respect to the light sources A and B that emit light beams having different wavelengths. Furthermore, the output signal of photoelectric converter 24 is adjusted by the light intensity of the light source B. The output difference between detection signals based on light beams transmitted through the identification target in this state is detected as an output from the high-pass filter 26. The sampling circuit 15 then samples a signal proportional to the difference in output between the detection values based on the light sources A and B, which is based on this output difference. Authentication is performed on the basis of the sampled value.

The light source A blink signal Sa and light source B blink signal Sb are used to control this alternate emission. The light intensity adjustment signal T is used to adjust each emission intensity. When the identification target reaches a recognition area, the above adjustment is not performed, and light intensity is fixed. The light intensity fixing signal Fb is a control signal for this operation.

In this embodiment, a deterioration in the light sources is suppressed by periodically setting an interval during which only emission is stopped while the adjusted level is held in the absence of an identification target, instead of continuing adjustment by always alternately causing the light sources A and B to emit light beams. This control will be described in detail later.

FIG. 2 shows the detailed arrangement of the light source B intensity changing/driving circuit 22.

Referring to FIG. 2, in accordance with the light source B blink signal Sb, the light source is ON/OFF-controlled. Light source driving current control is performed in accordance with the light intensity adjustment signal T. A light source driving current is fixed in accordance with the light intensity fixing signal Fb.

As shown in FIG. 2, an analog switch circuit is used to perform adjustment stop control based on the light intensity adjustment signal T when the light intensity fixing signal Fb is output. This circuit is integrally formed with a low-pass filter unit.

When the light intensity fixing signal Fb is “0”, the analog switching circuit is turned on. The output of the low-pass filter unit shifts to a voltage lower than the current voltage when the light intensity adjustment signal T is “0”, and shifts to a voltage higher than the current voltage when the light intensity adjustment signal T is “1”.

A sample-and-hold unit serves only as a buffer when the light intensity fixing signal Fb is “0”, and a change in output from the low-pass filter is directly used as a control signal for a light source driving current. As a consequence, when the current voltage shifts to a lower voltage, the driving current for the light source B increases.

When the current voltage shifts to a higher voltage, the driving current for the light source B decreases. When the light intensity fixing signal Fb becomes “1”, since the analog switch circuit is opened, the operational amplifier operates as a voltage hold circuit. As a consequence, the control signal for the light source driving current is fixed, and this state is held.

FIG. 3 shows an example of the detailed arrangement of the light source A driving circuit 21 in FIG. 1. As shown in FIG. 3, blinking of the light source A is controlled in accordance with ON/OFF of the light source A blink signal Sa.

According to the above description, the light source A 21 and light source B 22 are formed by light-emitting diodes having different arrangements. However, the present invention is not limited to the case wherein the light source A 21 and light source B 22 are formed by light-emitting diodes having different arrangements. The light source A 21 and light source B 22 may be integrated into a composite light source. FIG. 4 shows an example of the detailed arrangement of the light source A driving circuit 21 and light source B intensity changing/driving circuit 22 when they are integrated into a composite light source.

In the circuit shown in FIG. 4, light-emitting diodes are formed by cathode-common two-color light-emitting diodes. When the light source B blink signal Sb is “0”, both the light sources A and B are turned off (non-emission state) regardless of the state of the light source A blink signal Sa. When the light source A blink signal Sa is “0” and the light source B blink signal Sb is “1”, the light source A is turned off (no-emission state), and the light source B is turned on (emission state). When the light source A blink signal Sa is “1” and the light source B blink signal Sb is “1”, the light source A is turned on (emission state), the light source B is turned off (no-emission state).

Assume that in the following description, the light source A 21 and light source B 22 are formed by separate light sources, and the light source A driving circuit 21 and light source B intensity changing/driving circuit 22 respectively have the arrangements shown in FIGS. 3 and 2. With the arrangement shown in FIG. 4, these light sources can be treated in the same manner as described above by changing the control timing of the light source A blink signal Sa and light source B blink signal Sb from the control unit 10.

FIG. 5 shows control data for the output port of the CPU 11 which outputs four types of light source control signals (each consisting of one bit). The values of DD1 and DD2 are set in a control procedure to which the operation mode shifts. By alternately outputting combinations of two values of DD1 and DD2 to the output port, alternate control on the light sources which is unique to each mode is performed.

FIG. 5A shows control data set in a fixed emission mode (detection mode); FIG. 5B, control data in an adjustment emission mode (standby adjustment mode or pre-detection adjustment mode) of adjusting emission intensity; and FIG. 5C, control data set in a non-emission mode (standby hold mode) unique to this embodiment.

In the fixed emission mode shown in FIG. 5A, when DD1 is output to the output port, the light source A blink signal Sa becomes “1”, and the light source B blink signal Sb becomes “0”. As a consequence, only the light source A emits light. When DD2 is output to the output port afterward, the light source A blink signal Sa becomes “0”, and the light source B blink signal Sb becomes “1”. As a consequence, only the light source B emits light.

The light intensity fixing signal F becomes “1” regardless of whether DD1 or DD2 is output. At this time, the above analog switch circuit is open, and hence the light intensities set when the circuit was opened are fixed. As described above, in the fixed emission mode, the two light sources alternately emit light beams while the light intensities are kept in a given state. In this case, the light intensity adjustment signal T may be “1” or “0” because its value does not influence the emission condition.

In the adjustment emission mode shown in FIG. SB, when DD1 is output to the output port, the light source A blink signal Sa becomes “1”, and the light source B blink signal Sb becomes “0”. As a consequence only the light source A emits light. When DD2 is output to the output port afterward, the light source A blink signal Sa becomes “0”, and the light source B blink signal Sb becomes “1”. As a consequence, only the light source B emits light.

The light intensity fixing signal F becomes “0” regardless of whether DD1 or DD2 is output. At this time, the above analog switch circuit is on. Therefore, while “0” is output as the light intensity adjustment signal T, the light intensity of the light source B decreases. In contrast to this, while “1” is output as the light intensity adjustment signal T, the light intensity of the light source B increases. The degree of increase/decrease in light intensity is determined by the time constant of the low-pass filter unit.

In steps S112 and S113, the T-bit values of DD1 and DD2, each output as the light intensity adjustment signal T, are updated and stored on the basis of the result obtained by comparing a sampled value of an alternate output signal Vo with the reference voltage V1 in step S111 in the control procedure. These values are updated and output at a subsequent alternate switching timing.

Assume that a sampled value becomes small when the light source B is dominant with respect to the light source A as in this embodiment. In this case, if the sampled value is smaller than the value of the reference voltage V1, T bits are set to “0” to decrease the light intensity of the light source B. If the sample value is larger than the value of the reference voltage V1, T bits are set to “1”. As described above, in the adjustment emission mode, light source intensity adjustment is performed to always bring a sample value in an alternate emission state near to the reference value.

In the non-emission mode shown in FIG. 5C, the light source A blink signal Sa, light source B blink signal Sb, and light intensity fixing signal F are “0”, “0”, and “1”, respectively, regardless of whether DD1 or DD2 is output, and hence the light sources A and B emit no light. Since the analog switch circuit is open, a voltage value for defining light intensity which was set when the analog switch circuit was opened is fixed.

As described above, in the non-emission mode, the light intensity level in the non-emission state is kept at a certain level. In this case, the value of the light intensity adjustment signal T may be “1” or “0” because its value does not influence the emission condition.

In this embodiment, as described above, the light sources can be controlled by alternately outputting DD1 and DD2.

Figure 6:
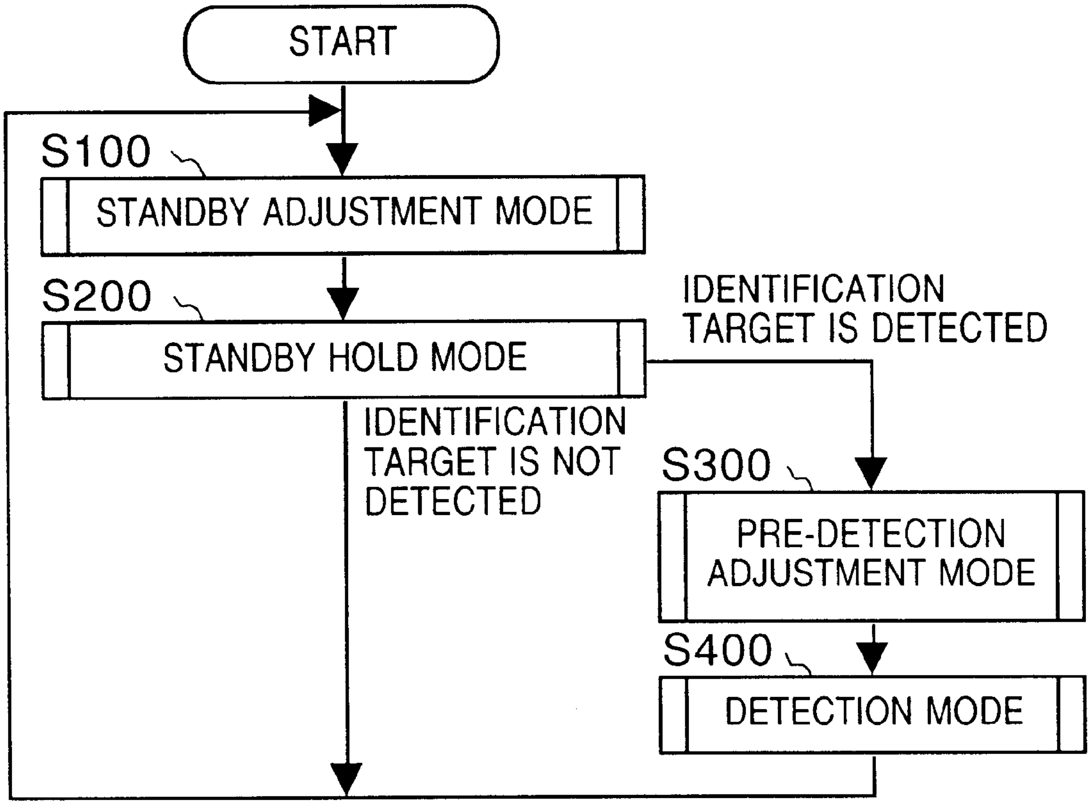
FIG. 6 is a flow chart showing general control in the first embodiment.

General control operation in this embodiment having the above arrangement will be described with reference to FIG. 6. FIG. 6 is a flow chart showing general control operation in this embodiment.

When the negotiable instrument identifying apparatus of this embodiment is powered on, predetermined initialization processing is executed first, and then, the control operation shown in FIG. 6 starts. First of all, in step S100 standby adjustment mode processing is executed to execute the adjustment mode for a predetermined period of time. In this mode, the light sources A and B alternately emit light beams, and the detection levels of the photoelectric converter 24 are made uniform.

More specifically, the CPU 11 repeats a light source driving cycle a predetermined number of times (60 times; a total of 15 msec, in this embodiment), in which the light sources A and B alternately emit light beams, the photoelectric converter 24 receives the light beams, and negative feedback control is performed to set the value A/D-converted by the A/D converter 14 to a specific value. Thereafter, the flow advances to step S200 to execute the standby hold mode of stopping emission control on the light sources A and B for a predetermined period of time.

In the standby hold mode processing in step S200, the CPU 11 repeats a light source driving cycle a predetermined number of times (8,000 times; a total of 2 sec, in this embodiment), in which the light intensity fixing signal Fb is output to hold the emission intensity level set when the flow shifted from the standby adjustment mode in step S100, and alternate emission is stopped in this state. Thereafter, the flow returns to the standby adjustment mode in step S100.

If the interruption of light is determined (the insertion of the identification target 100 is detected) by checking the detection state of the input sensor (Pi) 32 in every cycle in this standby hold mode, the flow advances to the pre-detection adjustment mode in step S300. Note that this detection state may be checked every several cycles.

In step S300, the CPU 11 executes the pre-detection adjustment mode of causing the light sources A and B to alternately emit light beams and making the detection levels of the photoelectric converter 24 uniform. In the pre-detection adjustment mode, the driving signal MS is output to the convey motor 41 to drive the convey motor so as to start conveying an identification target into the apparatus. At the same time, the CPU 11 performs the same operation as the standby adjustment mode in step S100 a predetermined number of times (e.g., 60 times; a total of 15 msec, in this embodiment). The flow then advances to the detection mode in step S400.

In the detection mode in step S400, the CPU 11 outputs the light intensity fixing signal Fb to hold the emission intensity level set when the flow advances from the pre-detection adjustment mode in step S300. While this state is held, the light sources A and B alternately emit light beams, and the sampling circuit 15 samples the output Vo from the amplifier circuit 27 in every cycle. In addition, the CPU 11 determines the current state by checking Pi 32, Ps 33, Pe 34, and Pr 35 in every cycle. After the CPU 11 repeats this operation a predetermined number of times (8,000 times or less in this embodiment), the flow returns to the standby adjustment mode in step S100.

If no identification target is detected after a lapse of a predetermined period of time in the standby hold mode processing in step S200, the flow advances to the processing in step S100 after a lapse of a predetermined period of time. The CPU 11 then alternately executes the processing in step S100 and the processing in step S200.

With this operation, the CPU 11 stops light emission during the execution of the processing in step S200 instead of always alternately causing the light sources A and B to emit light beams, thereby suppressing a decrease in the service life of each light source. In this embodiment, the control operation shown in FIG. 6 and driving control on the convey motor 41 (to be described in detail later) are switched every time the count value of a counter Mct for counting light source driving cycles reaches a predetermined count value.

Figure 7:
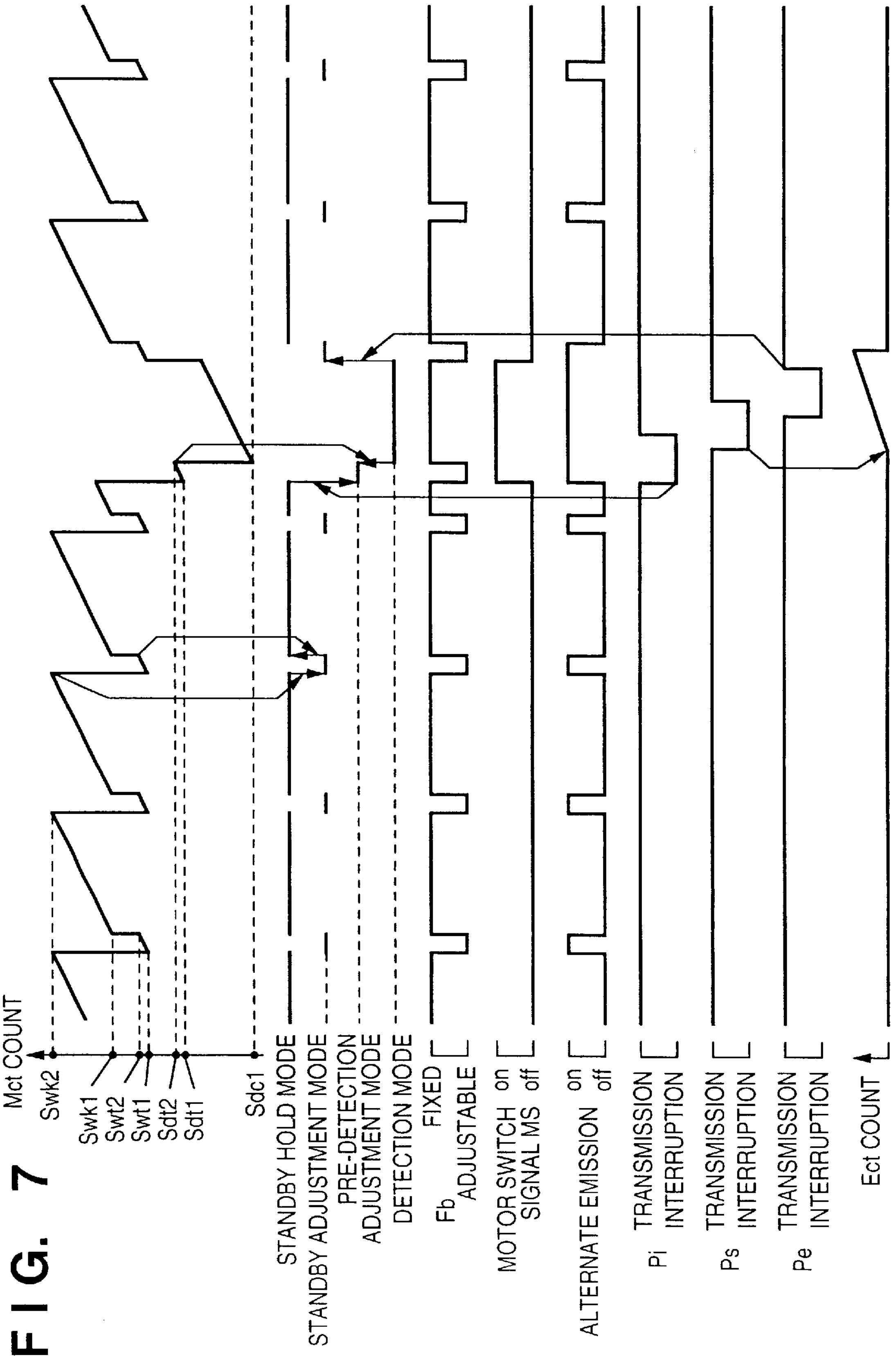
FIG. 7 is a timing chart showing the operation of the first embodiment.

FIG. 7 shows the count value of the counter Mct and each operation control switching timing. FIG. 7 is a timing chart showing the operation of this embodiment. The upper, intermediate, and lower portions of FIG. 7 respectively indicate the counter value of the counter Mct, the respective operation modes in FIG. 6, and the control timing of the convey motor 41 and light sources.

The execution of the standby hold mode is started when the Mct count value becomes Swk1, and is kept executed until the count value becomes Swk2. When the Mct count value becomes Swk2, the flow advances to the standby adjustment mode, and the Mct count value is set to Swt1. This mode is executed until the Mct count value becomes Swt2. During this period, the light intensity fixing signal Fb is set to be adjustable, and the light sources A and B alternately emit light beams to perform light intensity adjustment.

When the Mct count value becomes Swt2, the Mct count value is preset to Swk1, and the flow advances to the standby hold mode. If the input sensor (Pi) 32 detects the insertion of an identification target in the above standby hold mode, the flow advances to the pre-detection adjustment mode while presetting the Mct count value to Sdt1 to drive the convey motor 41 so as to convey the identification target to the identification area. During this period, the light intensity fixing signal Fb is set to be adjustable, and the light sources A and B alternately emit light beams, thereby performing light intensity adjustment.

When the Mct count value becomes Sdt2, the pre-detection adjustment mode is terminated, and the detection adjustment result is fixed. The Mct count value is then preset to Sdc1 to start the detection mode. The CPU 11 keeps driving the convey motor 41 to convey the identification target to the identification area, and waits for the arrival of the identification target at the position of the identification start sensor (Ps) 33. If the interruption of light is detected, a counter Ect for counting pulse signals Rck generated by the rotation sensor (Pr) 35 starts counting.

Subsequently, the properties of the identification target are obtained to perform determination by checking the sampled value of the reception output Vo and the position of the identification target specified by the count value of the counter Ect in correspondence with each other.

When the identification target passes the position of the identification end sensor (Pe) 34, the detection mode is terminated, and the Mct count value is preset to Swt1. The flow then advances to the standby adjustment mode.

FIG. 8 shows examples of the set values of the Mct count values in the respective modes. Referring to FIG. 8, "initial value (Mci)" is a preset value at the start of the execution of mode processing, "preset 2 (Mp2)" is an Mct count value at the time of the end of mode processing, and "preset 1 (Mp1)" indicates the alternate switching timing of the light sources A and B, which will be described later. "preset 1 (Mp1)" is the count value that shows the switching timing of the first adjustment and second adjustment described in the second embodiment. Note that the switching control table shown in FIG. 8 is stored in the memory 12.

Figure 9:
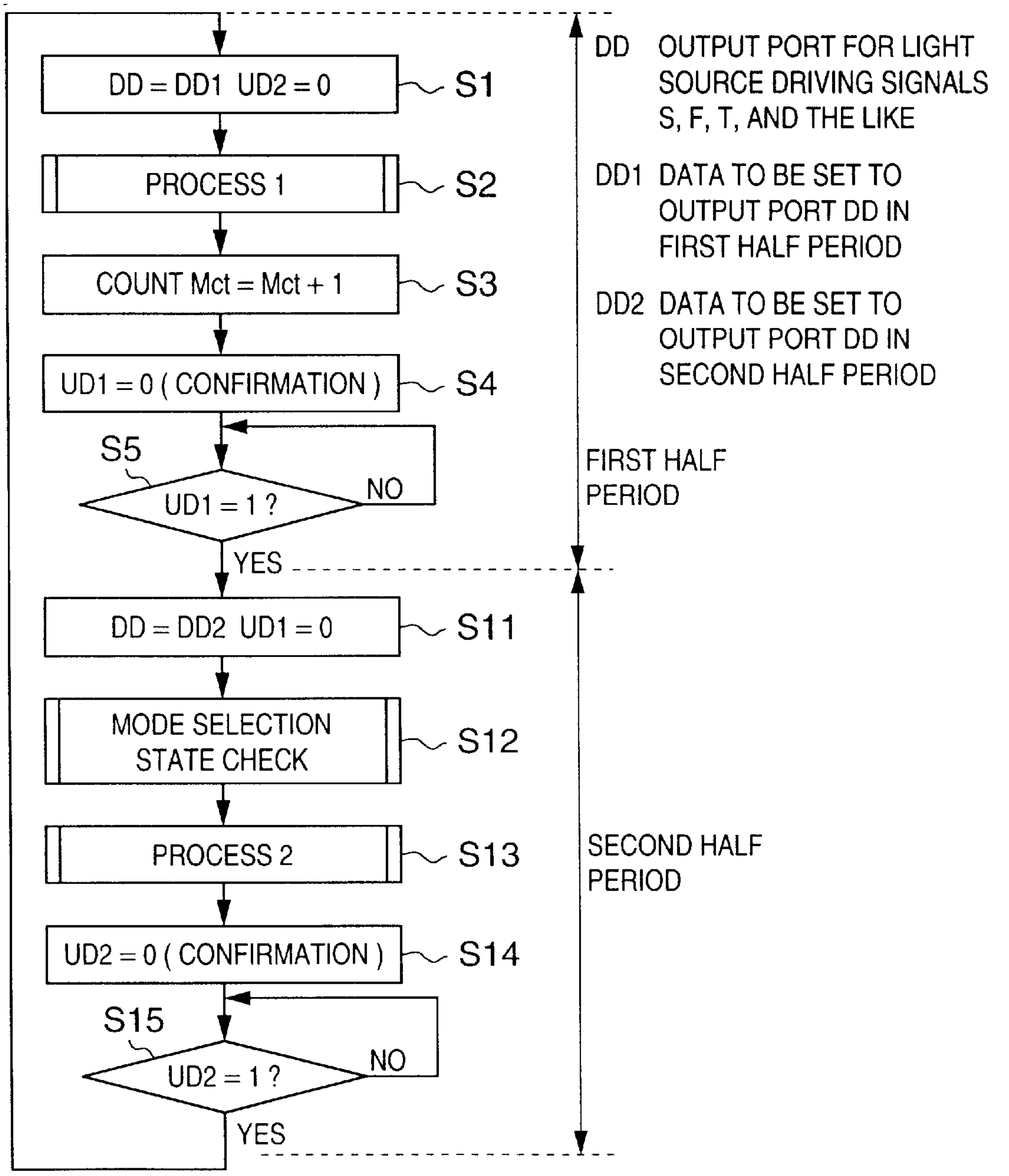
FIG. 9 is a flow chart showing operation in a light source driving cycle in the first embodiment.
Figure 10:
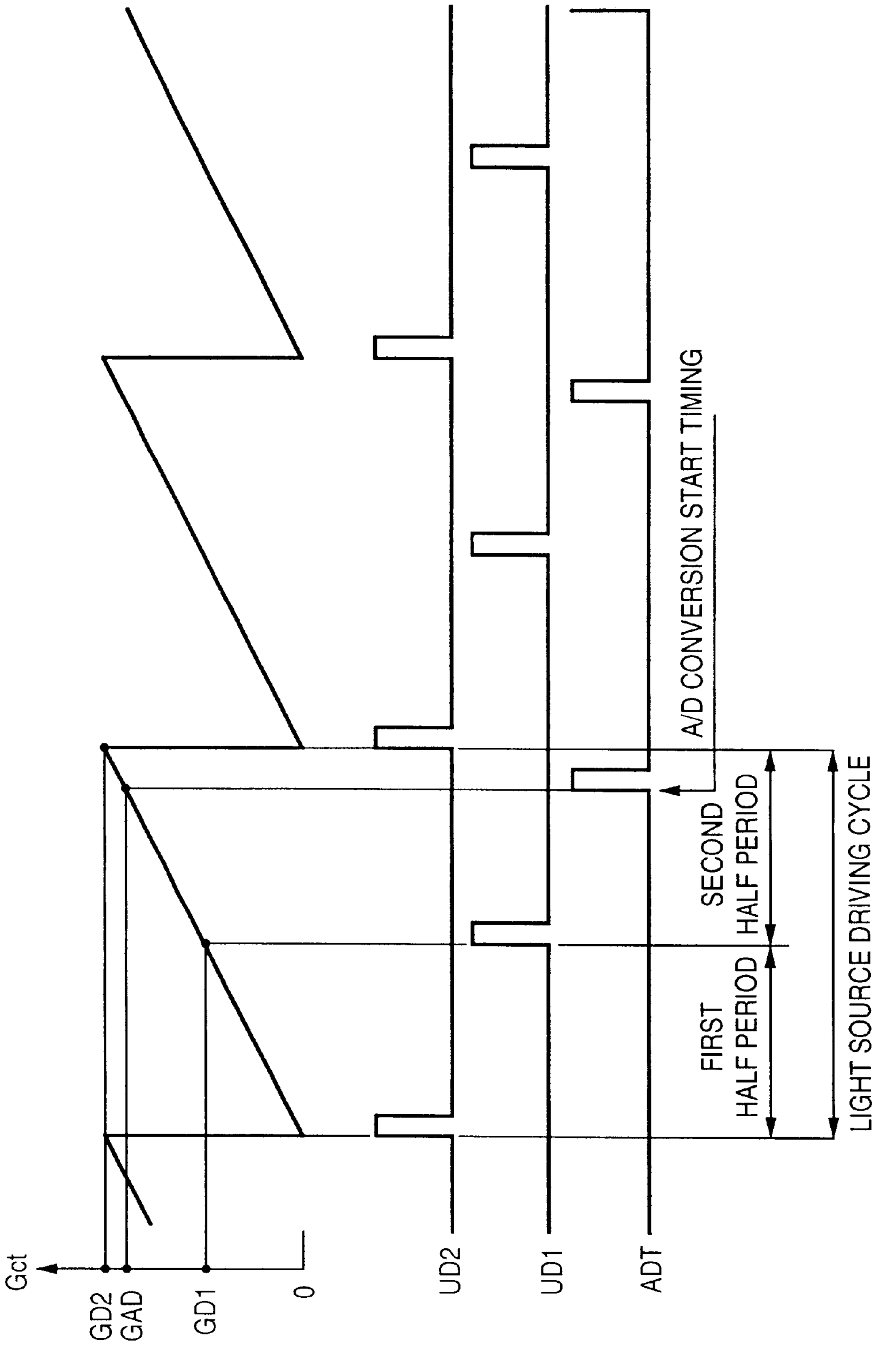
FIG. 10 is a timing chart showing the relationship between a light source driving cycle and signals generated by a timer and sent to the CPU in the first embodiment.

A detailed control example in this embodiment in setting the Mct count values shown in FIG. 8 will be described below with reference to FIG. 9. FIG. 9 is a flow chart showing operation in a light source driving cycle in this embodiment. FIG. 10 is a timing chart showing the relationship between the light source driving cycle and a signal generated by a timer and sent to the CPU in this embodiment. Referring to FIG. 9, reference symbol Mct denotes a counter incremented in every light source driving cycle. The value of the counter Mct is set to fall within a specific range in each operation mode. Each mode can therefore be identified by only checking the value of the counter Mct.

Referring to FIG. 9, light source A driving control in the first half period is performed in steps S1 to step S5. More specifically, the flow returns to step S1 if it is determined in step S15 in the previous cycle that a second half end signal is "1" (UD2="1"). In step S1, as shown in FIG. 5 DD1 is output to the output port (DD) to switch from the light source B driving state to the light source A driving state. UD2 is reset to "0". In step S2, the first processing (to be described in detail later) is executed. In this case, if sampling and A/D conversion are started in the second half period of the previous cycle, evaluation of conversion data, determination, processing, and the like are performed.

In step S3, the Mct counter is incremented by one to count the number of times this light source driving cycle is executed. In step S4, the CPU 11 checks UD1="0" indicating that the first half period has not ended. The flow then advances to step S5 in a first half end signal wait loop to check whether UD1="1".

If UD1="1", the flow advances to the processing in step S11 and subsequent steps, and advances to the light source B driving control in the second half period. In step S11, DD2 is output to DD to switch from the light source A driving state to the light source B driving state. UD1 is reset to "0" in advance. The flow then advances to step S12 to execute mode selection state check processing, thereby performing mode continuation or shift determination corresponding to each operation mode, initialization upon shift, a check on the position of the identification target, and the like.

In step S13, the second process is executed. In case that the present cycle is in need of setting A/D conversion, a conversion start signal is output to the sampling circuit 15 and A/D converter 14 at a predetermined timing after a preparation for conversion is made. In step S14, the CPU 11 confirms that UD2 is "0". In step S15, the CPU 11 monitors whether UD2 changes to "1". If UD2 becomes "1", the flow returns to step S1 to perform emission control on the light source A.

The timer 13 periodically outputs the first half period end signal UD1 associated with the light source driving cycle, the second half period end signal UD2 thereof, and an A/D conversion start signal ADT to the CPU 11 with predetermined time lags being kept among the respective signals. In this embodiment, as shown in FIG. 10, when the count value of a counter Gct for counting original oscillation clock signals (f=16 MHz) reaches predetermined count values GD1, GD2, and GAD, UD1, UD2, and ADT change from "0" to "1". In the case of GD2, the counter Gct is reset to continue a series of operations.

More specifically, GD1=2,000, GD2=4,000, and GA=3950 are set to obtain a light source driving cycle of 4 kHz (=16 MHz/4,000) and an A/D conversion timing generated in the second half period in synchronism with the light source driving cycle. Note that UD1, UD2, and ADT are reset from "1" to "0" under the control of the CPU 11 after they are detected by the CPU 11.

Figure 11:
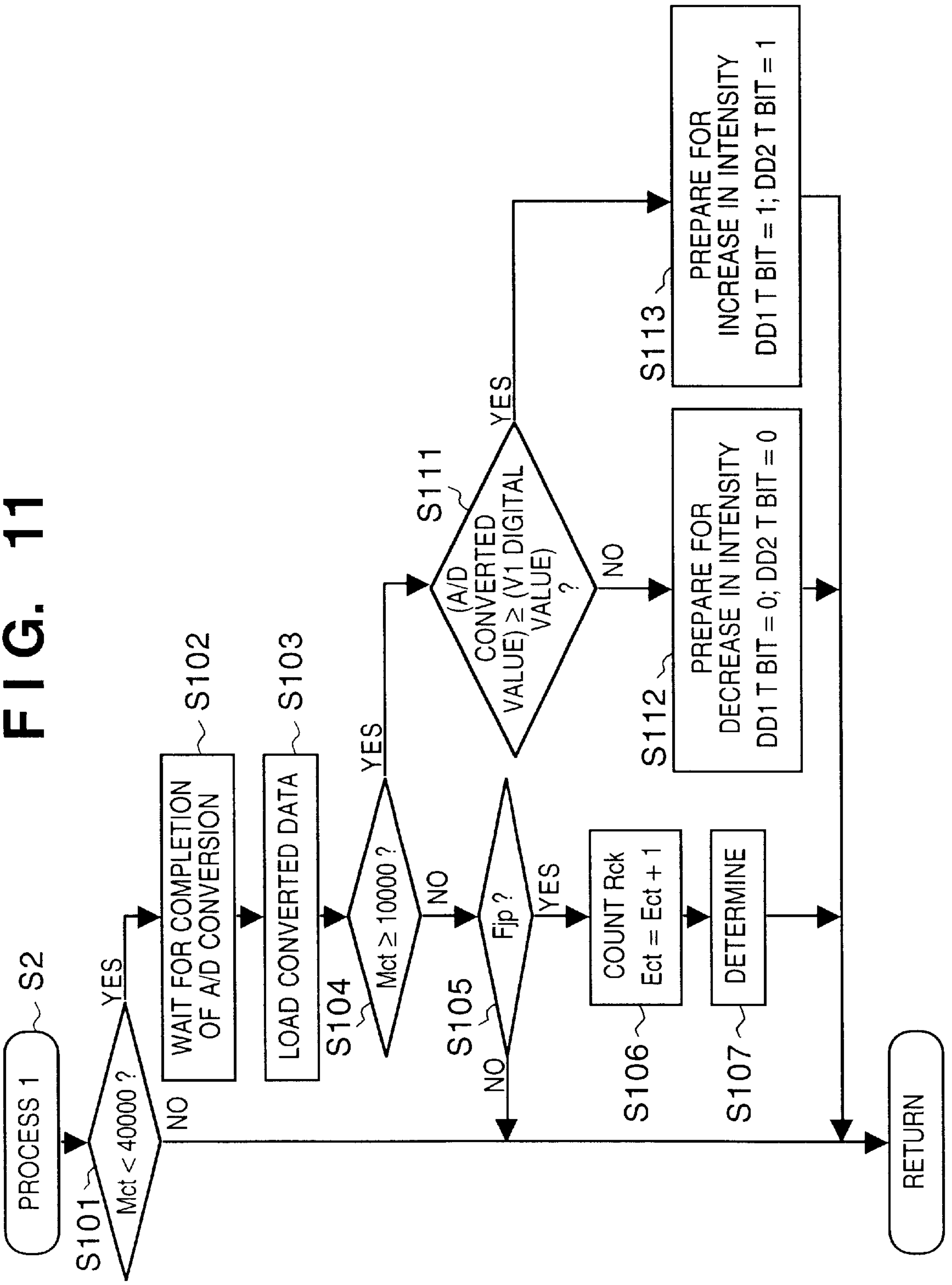
FIG. 11 is a flow chart showing the details of the first process in step S2 in FIG. 9.

FIG. 11 shows the first process in step S2 in FIG. 9 in detail. In the first process, first of all it is checked in step S101 whether the Mct count value is equal to or less than "40,000", which indicates a mode other than the discharge or standby hold mold. If the count value is not equal to or less than "40,000", since the standby hold mode is set, and no A/D conversion data needs to be loaded, the flow returns.

If it is determined in step S101 that the Mct count value is equal to or less than "40,000", the detection mode and each adjustment mode are set, and a value has been sampled and A/D conversion has been started in step S13. The flow therefore advances to step S102. If the end of conversion is confirmed by checking the conversion end signal, the flow advances to step S103. In step S103, the data from the A/D converter 14 is loaded into the CPU 11.

In step S104, whether the Mct count value is equal to or more than "10,000" is checked to determine whether the light intensity adjustment mode or detection mode is set.

If the Mct count value is "10,000" or less, it indicates that the detection mode is being executed. In step S105, it is checked whether a confirmation signal Fjp is stored. The confirmation signal Fjp is a marker indicating that the position of the identification target 100 can be specified. In step Sag (to be described in detail later), the confirmation signal Fjp is stored or set when a predetermined clock change of the pulse output Rck from the rotation sensor (Pr) 35 is confirmed between the previous light source driving cycle and the current cycle. If there is no confirmation signal Fjp, it is determined that the identification target 100 is not located at a position where its position should be determined, and the flow returns without performing determination.

If it is determined in step S105 that the confirmation signal Fjp is present, the flow advances to step S106 to count Rck and increment Ect by one. In step S107, determination processing is executed at the corresponding point, and the flow returns.

If it is determined in step S104 that the Mct count value is "10,000" or more, the flow advances to step S111 to compare the A/D-converted data value of the AC output signal Vo loaded in step S103 with a predetermined digital value corresponding to the reference voltage V1. If the reference voltage V1 is higher, the flow advances to step S112 to set the T bits of DD1 and DD2 to "0" to make a preparation for decreasing the light intensity of the light source B. The flow then returns.

If it is determined in step S111 that the reference voltage V1 is lower, the flow advances to step S113 to set the T bits of DD1 and DD2 to "1" to make a preparation for increasing the light intensity of the light source B. The flow then returns.

Figure 12:
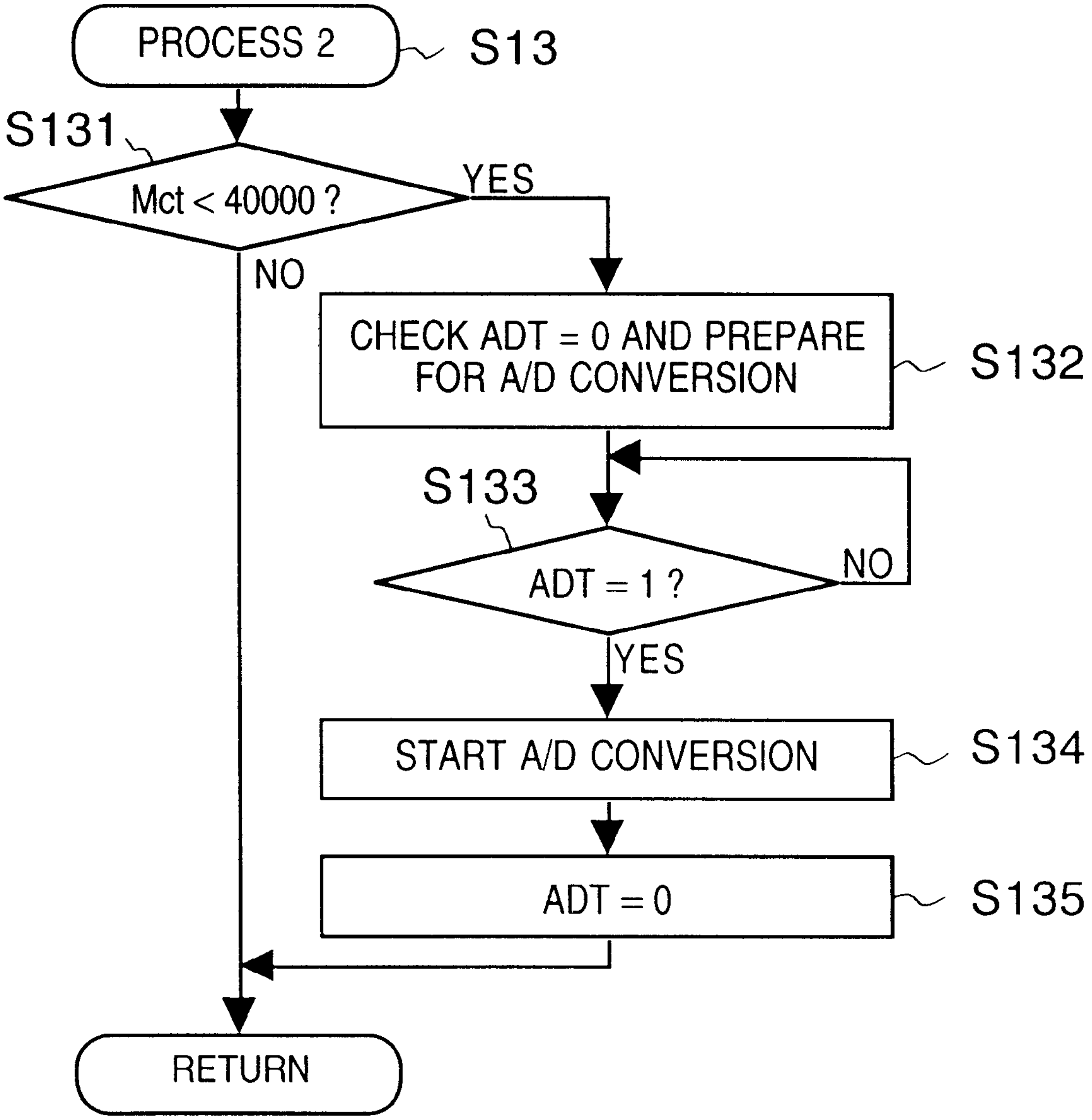
FIG. 12 is a flow chart showing the details of the second process in step S13 in FIG. 9.

FIG. 12 shows the detailed second process in step S13 in FIG. 9. In the second process, first of all it is checked in step S131 whether the Mct count value is "40,000" or less which indicates a mode other than the discharge or standby hold mode shown in FIG. 8. If the Mct count value is not "40,000" or less, since it indicates that the standby hold mode is set, the flow returns without performing A/D conversion.

If it is determined in step S131 that the Mct count value is "40,000" or less, since it indicates that a mode in which A/D conversion should be performed is set, the flow advances to step S132. It is then confirmed that the ADT signal is "0" before the A/D conversion timing in FIG. 10, and a preparation for A/D conversion processing is made.

In step S133, the CPU 11 monitors whether the A/D conversion timing has come, and the ADT signal becomes "1". If the A/D conversion timing has come, and the ADT signal becomes "1", the flow advances from step S133 to step S134 to output a conversion start signal to the sampling circuit 15 and A/D converter 14. The ADT signal is then set to "0", and the flow returns.

Figure 13A:
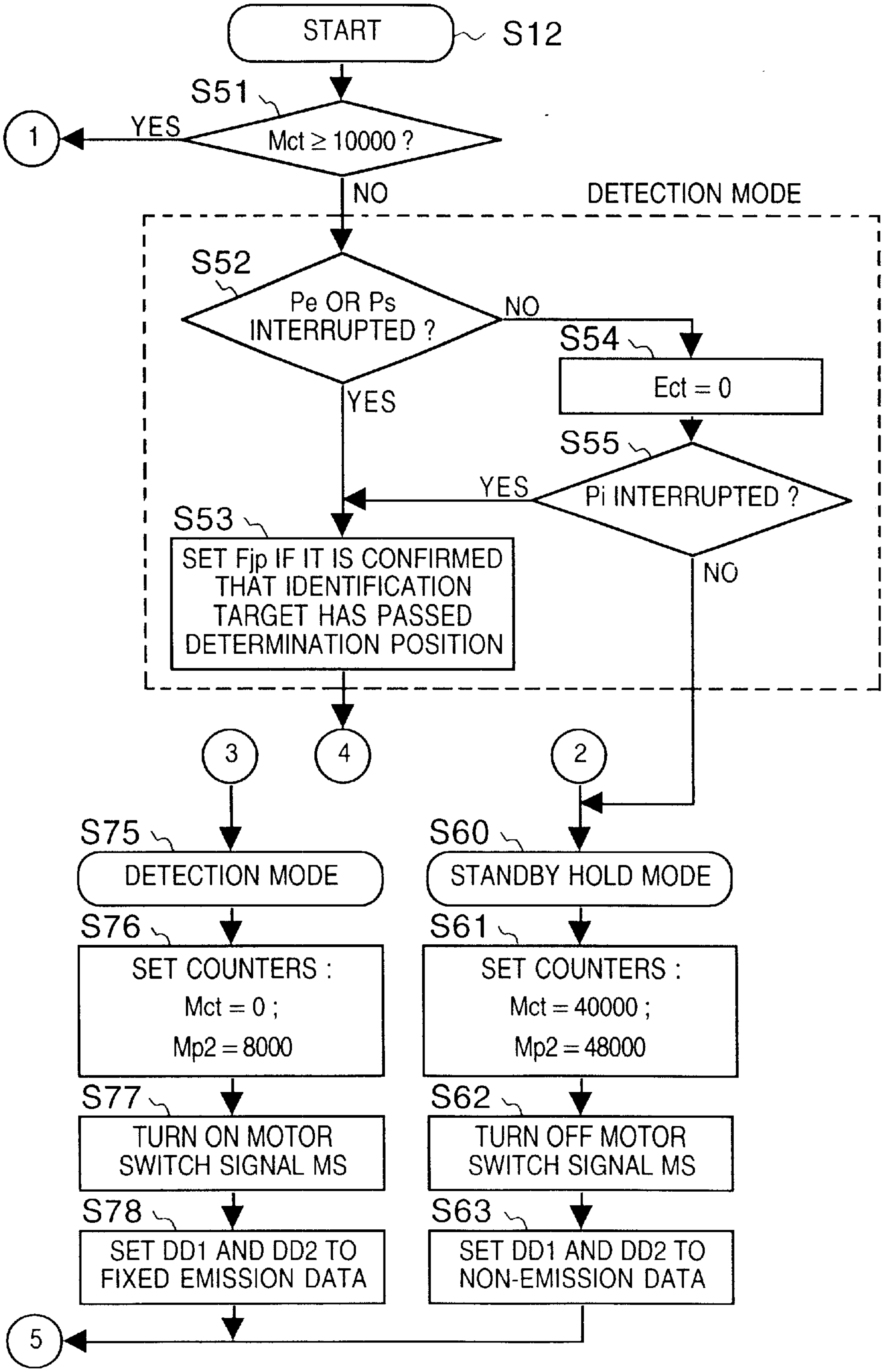
FIGS. 13A and 13B are flow charts showing the details of mode selection state check processing in step S12 in FIG. 9.
Figure 13B:
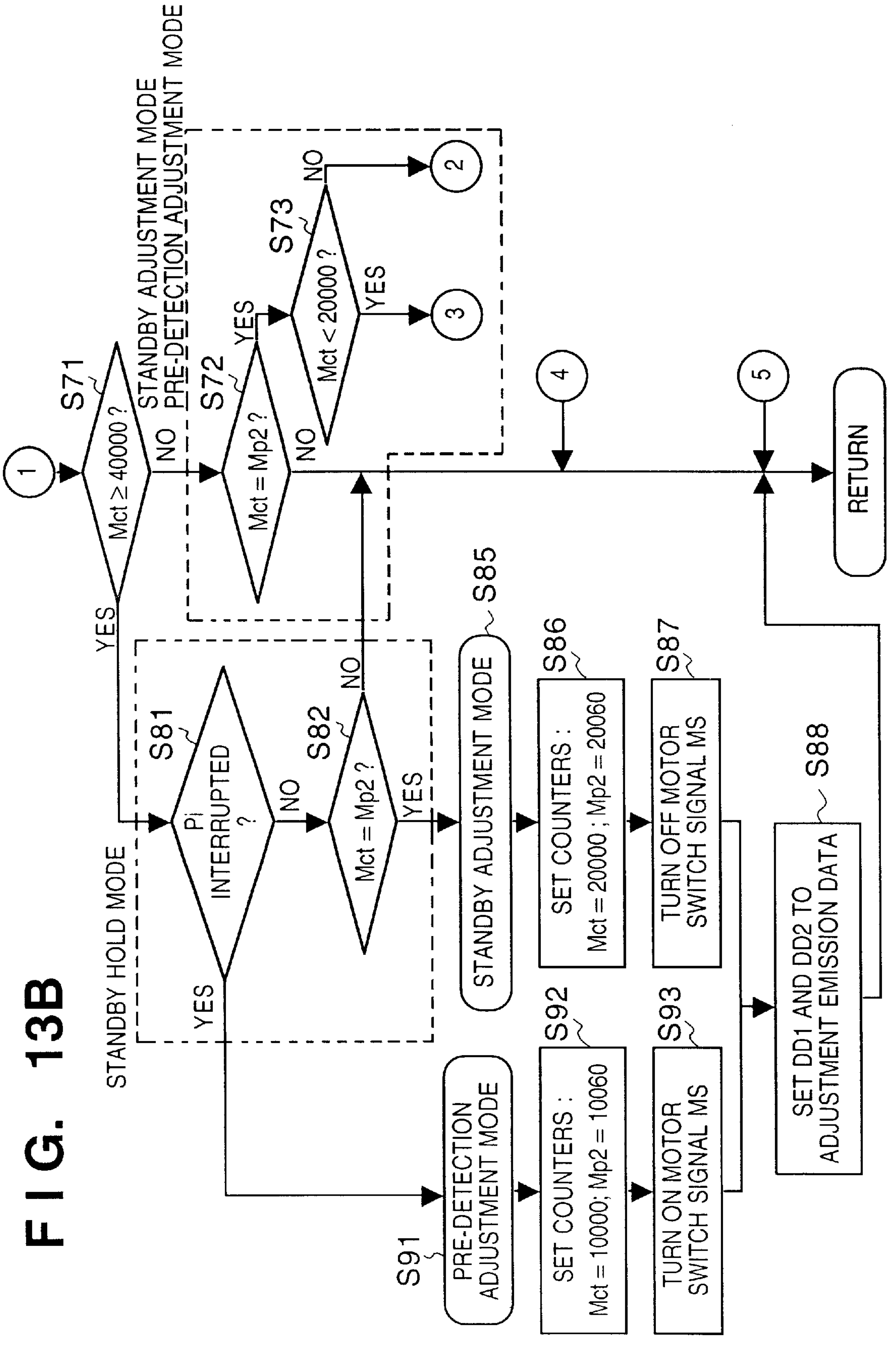

The mode selection state check processing in step S12 in FIG. 9 will be described in detail with reference to FIGS. 13A and 13B.

In the mode selection state check processing in step S12, first of all it is checked in step S51 whether the Mct count value is 10,000 or more, i.e., the detection mode is set. If the Mct count value is not 10,000 or more, since the detection mode is set, the flow advances to step S52 to check whether the Ps 33 or Pe 34 has detected the identification target 100, i.e., the identification target 100 is located in the identification area.

If it is determined in step S52 that the Ps 33 or Pe 34 has detected the identification target 100, the flow advances to step S53 to check the Pr 35 and compare its current value with the value detected by the Pr 35 and stored in the previous cycle. If a predetermined change in value is determined, it is determined that the identification target 100 has been conveyed by a predetermined amount. In this case, it is determined that a cycle in which the position of the identification target 100 can be specified is set, and the confirmation signal Fjp is stored. In addition, the value detected by the Pr 35 and stored in the previous cycle is updated to the detection value in the current cycle.

If it is determined in step S52 that neither the Ps 33 nor the Pe 34 have detected the identification target 100, it is determined that the identification target has not reached the position of the identification start sensor (Ps) 33. The flow then advances to step S54 to reset the counter Ect to "0", which counts Pr signals for specifying the position of the identification target from the identification start position.

In step S55, it is checked whether the input sensor Pi 32 has detected the identification target. If the input sensor Pi 32 has detected the identification target, it is determined that the leading edge of the identification target is located between the Pi 32 and the Ps 33. Thereafter, the identification target is conveyed upon rotation of the convey motor 41 and reaches the position of the Ps 33. The flow therefore advances to step S53.

If it is determined in step S55 that the input sensor Pi 32 has not detected the identification target, since a detection error may be present in the input sensor, the flow advances to the standby hold mode in step S60 and the subsequent steps. In step S60, the count value of the Mct count value is set to 40,000, and preset 2 (Mp2) is set to 48,000. In step S62, the MS signal is turned off to perform control so as not to drive the convey motor 41. In step S63, DD1 and DD2 as driving pulse data outputs are set to non-emission data. The flow then returns.

If it is determined in step S51 that the Mct count value is 10,000 or more, since the detection mode is not set, the flow advances to step S71 to check whether the Mct count value is 40,000 or more, i.e., an operation mode in which the light sources are not turned on, e.g., the standby hold mode, is set. If the Mct count value is not 40,000 or more, since the standby adjustment more or pre-detection adjustment mode is set, the flow advances to step S72 to check whether the Mct count value is equal to preset 2 (Mp2). If the Mct count value is not equal to preset 2 (Mp2), since it indicates that the adjustment mode has not been completed, the flow returns.

If the Mct count value becomes equal to preset 2 (Mp2), the flow advances to step S73. If the Mct count value is 20,000 or less, and the pre-detection adjustment mode is set, the detection mode in step S75 and the subsequent steps is started.

In step S76, the count value of the counter Mct is reset to "0", and preset 2 (Mp2) is set to 8,000 to execute the detection mode afterward. In order to insert the identification target 100 into the apparatus, the MS signal is enabled to continuously drive the convey motor 41, which has already been driven, in step S77. DD1 and DD2 as driving pulse data outputs are then set to fixed emission data. The flow then returns. With this operation, the emission intensities are fixed, and the identification target passes through the identification area.

If it is determined in step S73 that the Mct count value is not 20,000 or less, since it indicates that the standby adjustment or initialization adjustment is performed, the flow advances to the standby hold mode in step S60 and the subsequent steps. When this processing is complete, the Mct count value is set to 40,000, and preset 2 (Mp2) is set to 48,000 to shift to the hold mode. In step S62, the MS signal is turned off (disabled) to stop the convey motor 41. DD1 and DD2 as driving pulse data outputs are set to non-emission data. The flow then returns.

If it is determined in step S71 that the Mct count value is 40,000 or more, it indicates that the standby hold mode or discharge mode is being executed. The flow then advances to S81 to check whether light received by the input sensor (Pi) is interrupted, and an identification target is inserted into the apparatus. If light received by the input sensor (Pi) is not interrupted, the flow advances to step S82 to check whether the Mct count value becomes equal to preset 2 (Mp2), and the operation under execution is complete. If the Mct count value is not equal to preset 2 (Mp2), the flow returns.

If it is determined in step S82 that the Mct count value is equal to preset 2 (Mp2), the flow advances to the standby adjustment mode in step S85 and the subsequent steps. In step S86, the Mct count value is set to 20,000, and preset 2

(Mp2) is set to 20,060. In step S87, the MS signal is turned off (disabled) to stop the convey motor 41. In step S88, DD1 and DD2 as driving pulse data outputs are set to adjustment emission data. The flow then returns.

If it is determined in step S81 that light received by the input sensor (Pi) is interrupted, and an identification target is inserted into the apparatus, the Mct count value is set to 10,000 and preset 2 (Mp2) is set to 10,060 to shift to the pre-detection adjustment mode in step S91 and the subsequent steps. In step S93 the MS signal is turned on to drive the convey motor 41 to insert the identification target into the apparatus, and pre-detection adjustment is executed at the same time. In step S88, DD1 and DD2 as driving pulse data outputs are set to adjustment emission data. The flow then returns.

Figure 14:
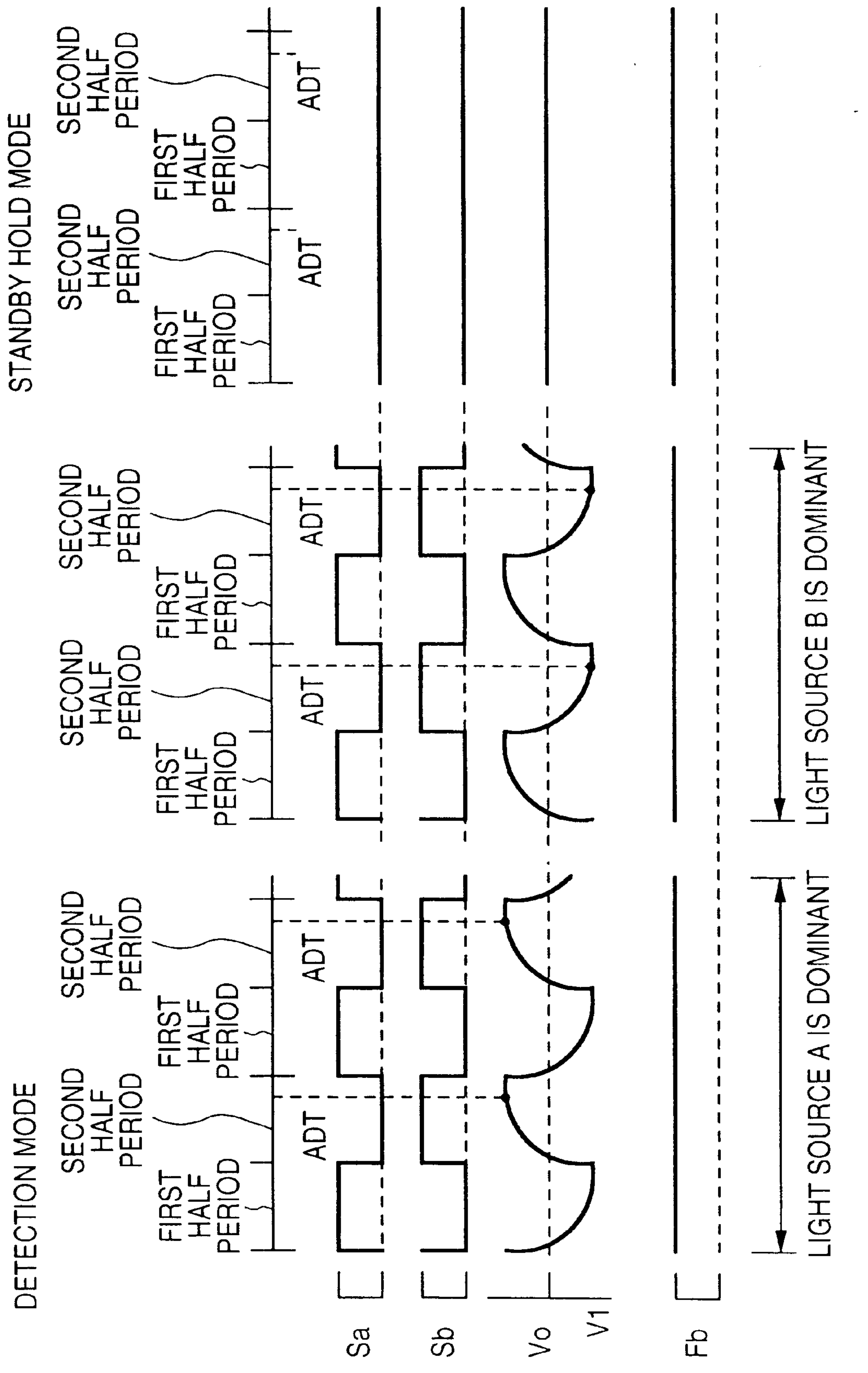
FIG. 14 is a timing chart showing examples of driving control signals for the light sources A and B and detection signal timings in the detection mode and standby hold mode according to the first embodiment.
Figure 15:
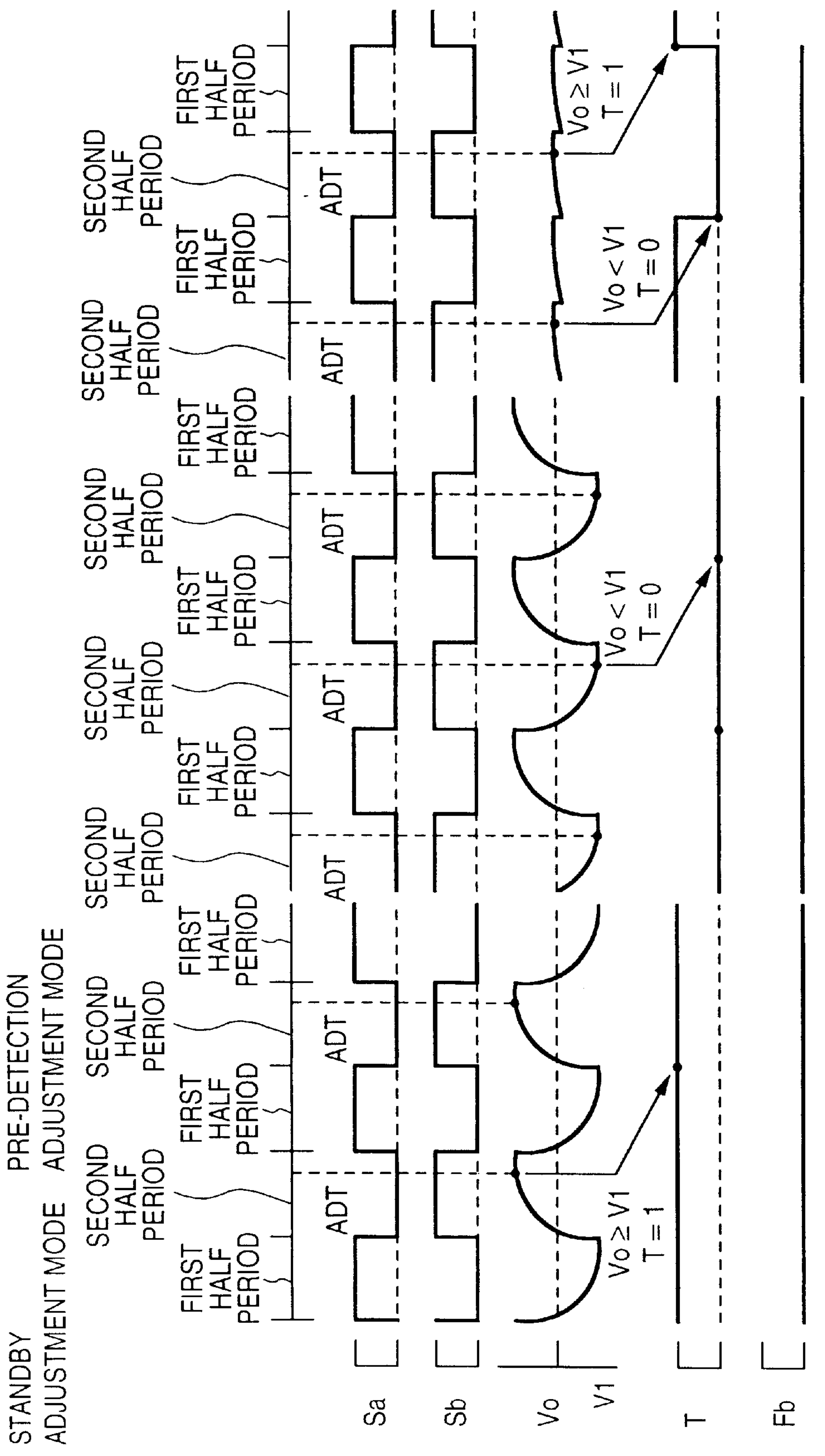
FIG. 15 is a timing chart showing examples of driving control signals for the light sources A and B and detection signal timings in the standby adjustment mode and pre-detection mode according to the first embodiment.

FIG. 14 shows examples of driving control signals and detection signal timings for the light source A/light source B 23 in the detection mode and standby hold mode in the above control. FIG. 15 shows examples of driving control signals and detection signal timings for the light source A/light source B 23 in the standby adjustment mode and pre-detection adjustment mode. Note that the detection output Vo is indicated in opposite phase to become lower than the reference voltage V1 when one light source that is dominant with respect to the other light source emits light.

Identification control for an identification target in this embodiment of the present invention, which has the above arrangement, will be described below. In this embodiment, control operation is performed to set a detection output sampled value to the reference voltage V1 before an identification target reaches the detection range. The output of the log amplifier 25 at the sampling timing is also controlled to a predetermined voltage.

When the identification target reaches the detection range while the amounts of light beams emitted from the light source A/light source B 23 in this control state are fixed, the photoelectric converter 24 outputs an electrical signal corresponding to the wavelength of light emitted from each light source 23 and having passed through the identification target. This signal is amplified by the log amplifier 25 and output to the high-pass filter 26.

The waveform of the output Vo in FIG. 14 and 15 is opposite in phase to a change in light amount. For this reason, if, for example, the color of the identification target in the detection range is reddish rather than greenish (the transmittance degree of light from the light source A is higher) when the light source A is a red and the light source B is a green the output voltage of a signal at the light source A emission timing becomes smaller than that of a signal at the light source B emission timing in the case shown in FIG. 14. In contrast to this, if the identification target in the detection range is greenish rather than reddish (the transmittance degree of light from the light source B is higher), the output voltage value of a signal at the light source B emission timing becomes smaller than that of a signal at the light source A emission timing.

Referring to FIG. 14, at the timing when light source A is dominant that is the Sa signal output timing, the color of the identification target in the detection range is reddish rather than greenish, and hence the output voltage value of a signal at the light source A emission timing is smaller than that of a signal at the light source B emission timing. At the timing when the light source B is dominant that is the Sb signal output timing, the color of the identification target in the detection range is greenish rather than reddish, and hence the output voltage value of a signal at the light source B emission timing is smaller than that of a signal at the light source A emission timing.

The high-pass filter 26 removes components having frequencies less than the light source driving frequency from a detection signal to extract only AC components having frequencies equal to or higher than the light source driving frequency. The amplifier circuit 27 amplifies the light source driving frequency and superimposes the reference voltage V1 on the extracted components. The sampling circuit 15 samples waveform data at the detection timing (second half period of a light source driving cycle) of light emitted from the light source B from this superimposed waveform. The A/D converter 14 A/D-converts the sampled data. The resultant data is stored in the form of a digital value until the next A/D conversion.

In this embodiment, the amplifier circuit 27 outputs a signal that oscillates to the positive or negative side with respect to the reference voltage V1 in proportion to changes (the difference between detection signals when the photoelectric converter 24 receives light beams from the two light sources) in the amounts of light beams detected from the light sources A and B. For example, therefore, the extent to which the color of an identification target is reddish (when the signal oscillates to the positive side) or the extent to which the color of an identification target is greenish (when the signal oscillates to the negative side) can be detected by only sampling a signal at the detection timing of light emitted from the light source B.

As a consequence, there is no need to perform identification for each of a plurality of colors in authenticating an identification target such as a negotiable instrument (to be described later), and a specific one of the colors which has the highest density can be determined by only determining one type of detection signal. This makes it possible to greatly simplify the arrangement of the apparatus.

The CPU 11 loads the signal level of a detection signal change (color appearance and degree) caused upon switching from the light source A to the light source B, which is the sampling result obtained by the sampling circuit 15. As shown in FIG. 14, in this embodiment the tendency of the color of an identification target with respect to light beams emitted from the light source A/light source B 23 is output as one signal.

The CPU 11 therefore compares this detection signal pattern with the standard pattern obtained by detecting an authentic identification target (negotiable instrument or the like) and registered in the memory 12 in advance at predetermined convey intervals, thereby determining the degree of similarity. If a predetermined degree of similarity or higher is determined, the identification target is identified as an authentic one.

It suffices if one type of standard pattern is held to be compared for each type of identification target (e.g., a negotiable instrument or bill). Identification processing can therefore be simplified. In addition, even comparison with only one type of standard pattern can cope with a plurality of types of color errors and can properly cope with almost all color errors.

Even if, therefore, a bill image is printed on only one surface of a sheet which should have bill images printed on the two surfaces, or bill images are copied on the two surfaces of a sheet or a bill image is copied on one surface of a sheet by using a copying machine, authentication can be properly performed.

Figure 16:
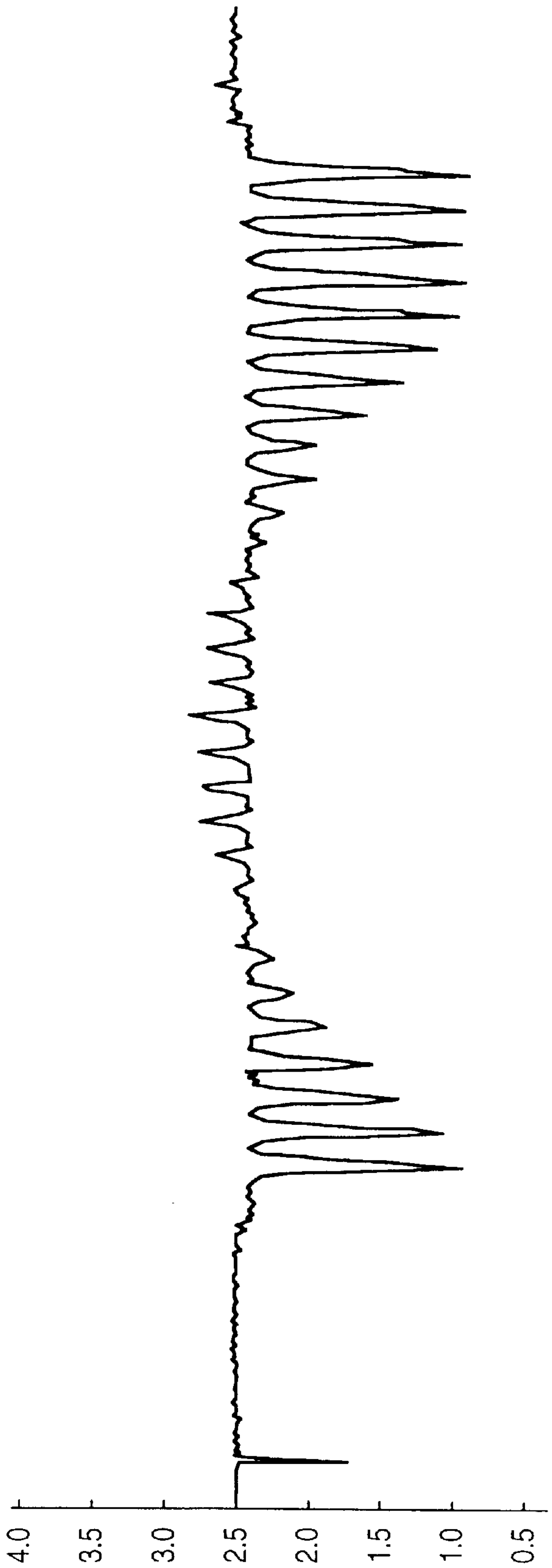
FIG. 16 is a graph showing the sampling result with respect to a predetermined identification target in the first embodiment.
Figure 17:
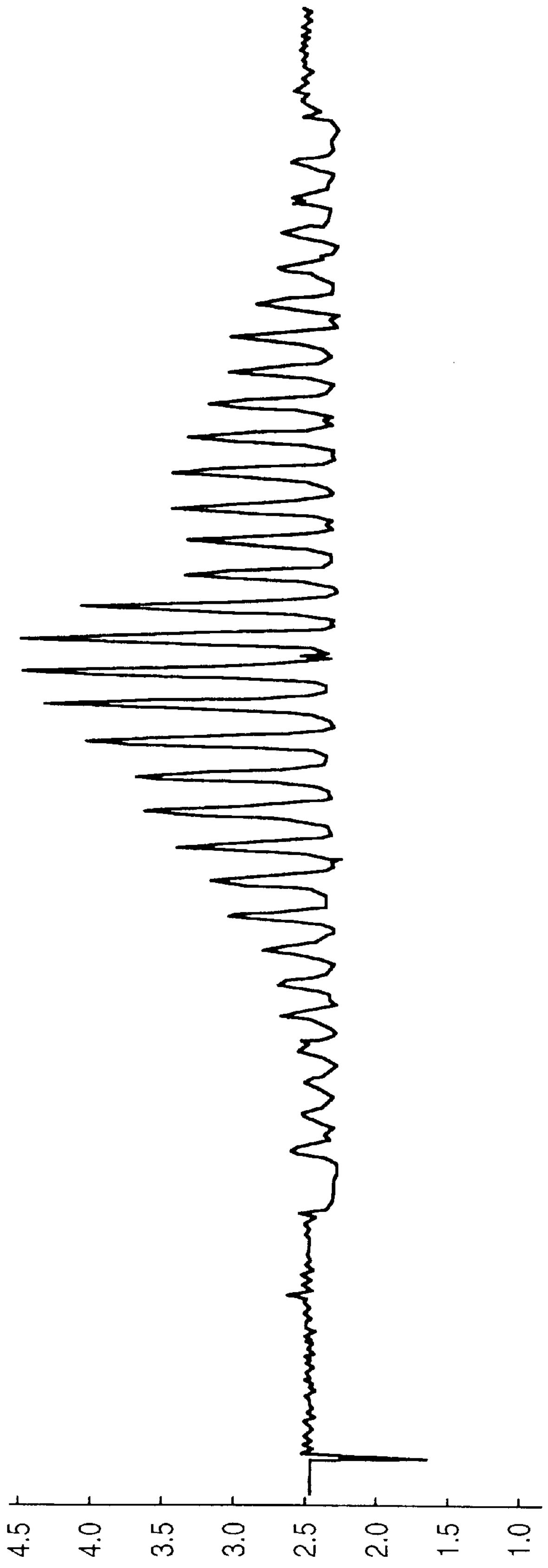
FIG. 17 is a graph showing the sampling result obtained with respect to a predetermined identification target in the first embodiment.

FIGS. 16 and 17 show sampling results with respect to a predetermined identification target (using a proper color chart) in this embodiment. FIG. 16 shows the sampling result obtained with respect to the identification target when green and red light-emitting diodes are respectively used as the light sources A and B.

FIG. 17 show s the sampling result obtained with respect to the identification target when an infrared light-emitting diode and red light-emitting diode are respectively used as the light sources A and B. In this case, although whether the identification target is reddish, bluish, or greenish, i.e., a color arrangement, cannot be accurately determined, high-sensitivity detection can be performed within the green gamut.

As described above, according to this embodiment, there is provided a light-transmitting object identifying apparatus which can automatically solve problems associated with variations in performance of each constituent member of a mechanism for detecting an identification object, changes in performance over time, and changes in performance due to environments with a simple arrangement, can be easily manufactured and adjusted, and has high reliability.

In addition, since the difference in color taste between an authentic object and an identification target can be expressed as a single signal with respect to the identification target, reliable authentication can be performed using a simple algorithm.

Furthermore, a deterioration in the light sources can be minimized because the apparatus is designed to perform detection sensitivity adjustment at predetermined intervals and inhibit the light sources from emitting light while no adjustment is performed, in the absence of an identification target, instead of performing adjustment by always causing the light sources to emit light.

[Second Embodiment]

According to the above description, the light source 23 has two light sources, and the photoelectric converter 24 is used to detect light beams emitted from the two light sources and transmitted through an identification target. However, the present invention is not limited to the above arrangement. Obviously, the light source may be constituted by a plurality of light sources. For example, the light source A may be constituted by light sources A1 and A2.

In this case, the emission intensities of the light sources can be made uniform by using a method of adjusting the emission intensities of the light sources A1 and A2 by causing them to emit light beams at a timing B while the emission of the light source B is stopped, and then adjusting the light source A (constituted by the light sources A1 and A2) and the light source B after returning the emission timing of the light source A2 to a timing A. Since the adjustment can be realized by the same operation as that described above except for switching of the light source driving circuit, the circuit arrangement can be simplified.

For example, the use of a composite light source constituted by green and infrared LEDs and a red LED makes it easy to detect bluish and greenish colors as compared with the case wherein green and red LEDs are used.

The second embodiment of the present invention, in which a light source is constituted by a plurality of light sources, will be described below. The same reference numerals as in the first embodiment denote the same parts in the second embodiment described below, and a detailed description thereof will be omitted.

Figure 18:
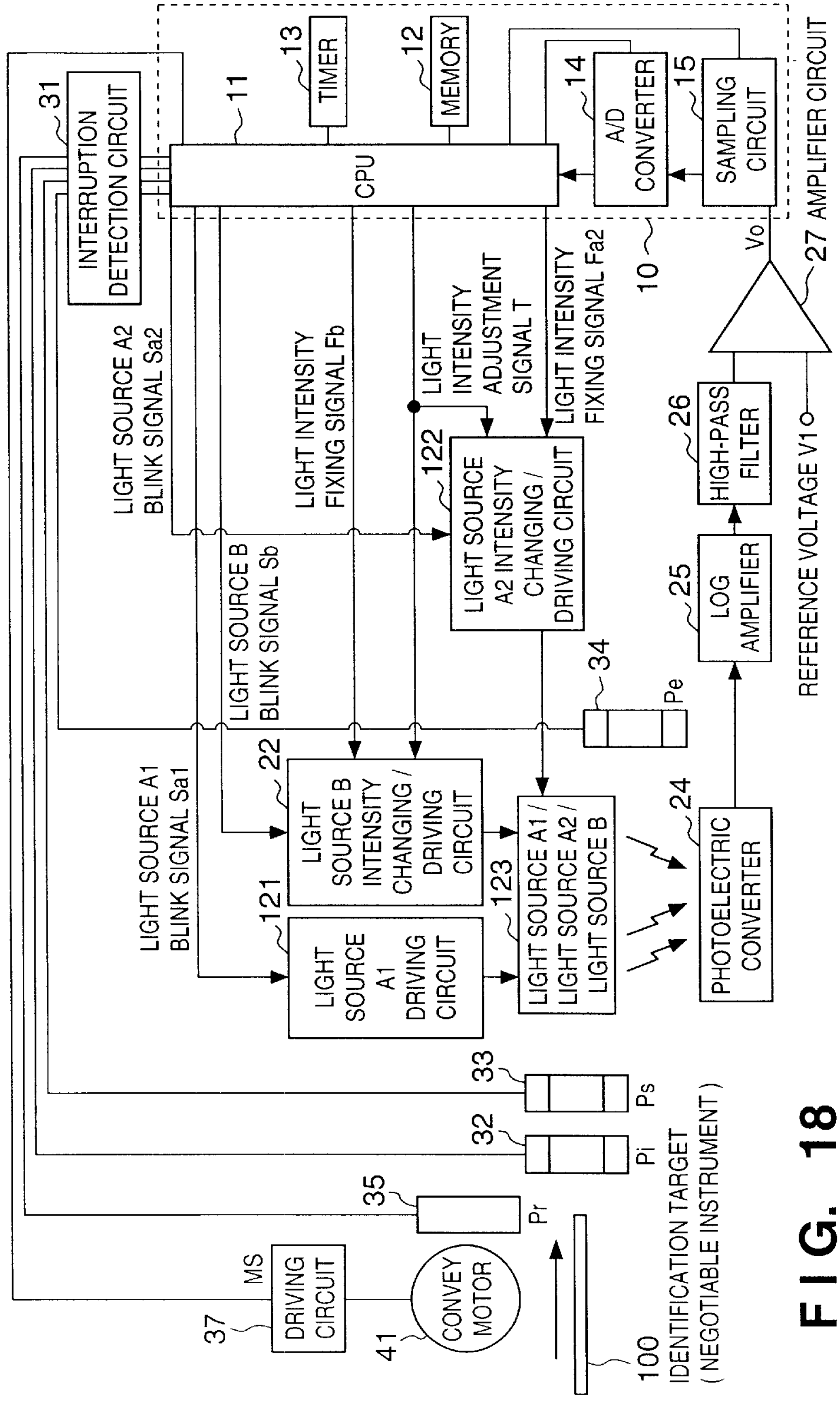
FIG. 18 is a block diagram showing the arrangement of a negotiable instrument identifying apparatus according to the second embodiment of the present invention.

FIG. 18 shows the arrangement of a negotiable instrument identifying apparatus according to the second embodiment of the present invention. The second embodiment shown in FIG. 18 includes a light source A1 driving circuit 121 having an arrangement similar to that of the light source A driving circuit 21 in the first embodiment shown in FIG. 1, and differs from the first embodiment in that the second embodiment also includes a light source A2 intensity changing/driving circuit 122 and a composite light source 123 constituted by light sources A1, A2, and B. As output control signals from the output port of a CPU 11, a light source A1 blink signal Sa1 similar to the light source A blink signal Sa, light source A2 blink signal Sa2, and light intensity fixing signal Fa2 are prepared.

In the second embodiment, when a light source is constituted by a plurality of light sources, for example, the light source A shown in FIG. 18 is made of light sources A1 and A2, the light source A2 is caused to emit light at the timing of the light source B to adjust the emission intensities of the light sources A1 and A2 while the emission of the light source B is stopped in the first adjustment emission.

The emission intensities of the composite light source can be made uniform by using the method of adjusting the emission intensities of the light sources A1 and A2 first, restoring the timing of the light source A2 to that of the light source A after the second adjustment emission process, and then adjusting the light source A (constituted by the light sources A1 and A2). In addition, since the adjustment can be realized by the same operation as that in the first embodiment except for switching of the light source driving circuit, the circuit arrangement can be simplified.

FIGS. 19A to 19D show control data for the output port of the CPU 11, which outputs six types of light source control signal (each consisting of one bit) in the second embodiment. The values of DD1 and DD2 are set in a control procedure to which the operation mode shifts. By alternately outputting combinations of two values of DD1 and DD2 to the output port, alternate control on the light sources which is unique to each mode is performed.

FIG. 19A shows control data set in a fixed emission mode (detection mode); FIG. 19B, control data in the first adjustment emission mode (standby adjustment mode or pre-detection adjustment mode) of adjusting emission intensity; FIG. 19C, control data in the second adjustment emission mode (standby adjustment mode or pre-detection adjustment mode) of adjusting emission intensity; and FIG. 19D, control data set in a non-emission mode (standby hold mode).

In the fixed emission mode shown in FIG. 19A, when DD1 is output to the output port, the blink signals Sa1 and Sa2 for the light sources A1 and A2 become "1", and the light source B blink signal Sb becomes "0". As a consequence, the light sources A1 and A2 emit light. When DD2 is output to the output port afterward, the blink signals Sa1 and Sa2 for the light sources A1 and A2 become "0", and the light source B blink signal Sb becomes "1". As a consequence, only the light source B emits light.

The light intensity fixing signals Fa2 and Fb become "1" regardless whether DD1 or DD2 is output, and the analog switch circuit described above is open at this time. Therefore, the light intensities set when the analog switch circuit was opened are fixed. As described above, in this mode, the light source A (constituted by the light sources A1 and A2) and the light source B are caused to alternately emit light while certain light intensities are fixed. In this case, the value of the light intensity adjustment signal T may be either "1" or "0" because it does not influence the emission condition.

In the first adjustment emission mode shown in FIG. 19B, when DD1 is output to the output port, the light source A1 blink signal Sa1, light source A2 blink signal Sa2, and light source B blink signal Sb respectively become "1", "0", and "0". As a consequence, only the light source A1 emits light. When DD2 is output to the output port afterward, the light source A1 blink signal Sa1, light source A2 blink signal Sa2, and light source B blink signal Sb respectively become "0", "1", and "0". As a consequence, only the light source A2 emits light.

The light intensity fixing signal Fb is "1" regardless of whether DD1 or DD2 is output, and hence the light source B keeps its light intensity level while stopping light emission. The light intensity fixing signal Fa2 is "0" regardless of whether DD1 or DD2 is output, and the above analog switch circuit is on at this time. For this reason, while "0" is output as the light intensity adjustment signal T, the light intensity of the light source A2 decreases. In contrast to this, while "1" is output, the light intensity of the light source A2 increases.

As described above, in the first adjustment emission mode, the light source B holds its light intensity level while stopping light emission, and intensity adjustment of the light source A2 is performed to always bring sampled values near to a reference value while the light sources A1 and A2 are caused to alternately emit light.

In the second adjustment emission mode shown in FIG. 19C, when DD1 is output to the output port, the light source A1 blink signal Sa1, light source A2 blink signal Sa2, and light source B blink signal Sb respectively become "1", "1", and "0". As a consequence, both the light sources A1 and A2 emit light.

When DD2 is output to the output port afterward, the light source A1 blink signal Sa1, light source A2 blink signal Sa2, and light source B blink signal Sb respectively become "0", "0", and "1". As a consequence, only the light source B emits light.

The light intensity fixing signal Fa2 is "1" regardless of whether DD1 or DD2 is output, and hence the light intensity of the light source A2 is fixed. The light intensity fixing signal Fb is "0" regardless of whether DD1 or DD2 is output, and the above analog switch circuit is on at this time. For this reason, while "0" is output as the light intensity adjustment signal T, the light intensity of the light source B decreases. In contrast to this, while "1" is output, the light intensity of the light source B increases.

As described above, in the second adjustment emission mode, intensity adjustment of the light source B is performed to always bring sampled values near to a reference value while the light sources A and B constituting the composite light source whose light intensity ratio is fixed are caused to alternately emit light.

In the non-emission mode shown in FIG. 19D, each of the light source A1 blink signal Sa1, light source A2 blink signal Sa2, and light source B blink signal Sb becomes "0" regardless of whether DD1 or DD2 is output. As a consequence, light emission is kept stopped. Each of the light intensity fixing signals Fa2 and Fb becomes "1" regardless of whether DD1 or DD2 is output, and the above analog switch circuit is open. The voltage values for defining light intensities which were set when the analog switch circuit was opened are fixed.

As described above, in the non-emission mode, a certain light source level is held in a non-emission state. In this case, the light intensity adjustment signal T may be "1" or "0" because its value does not influence the emission condition.

As described above, the light sources can be controlled by alternately outputting DD1 and DD2.

The general control in the second embodiment having the above arrangement is the same as that in the first embodiment except for mode selection state check processing. The mode selection state check processing in the second embodiment will be described with reference to FIGS. 20A and 20B.

Figure 20A:
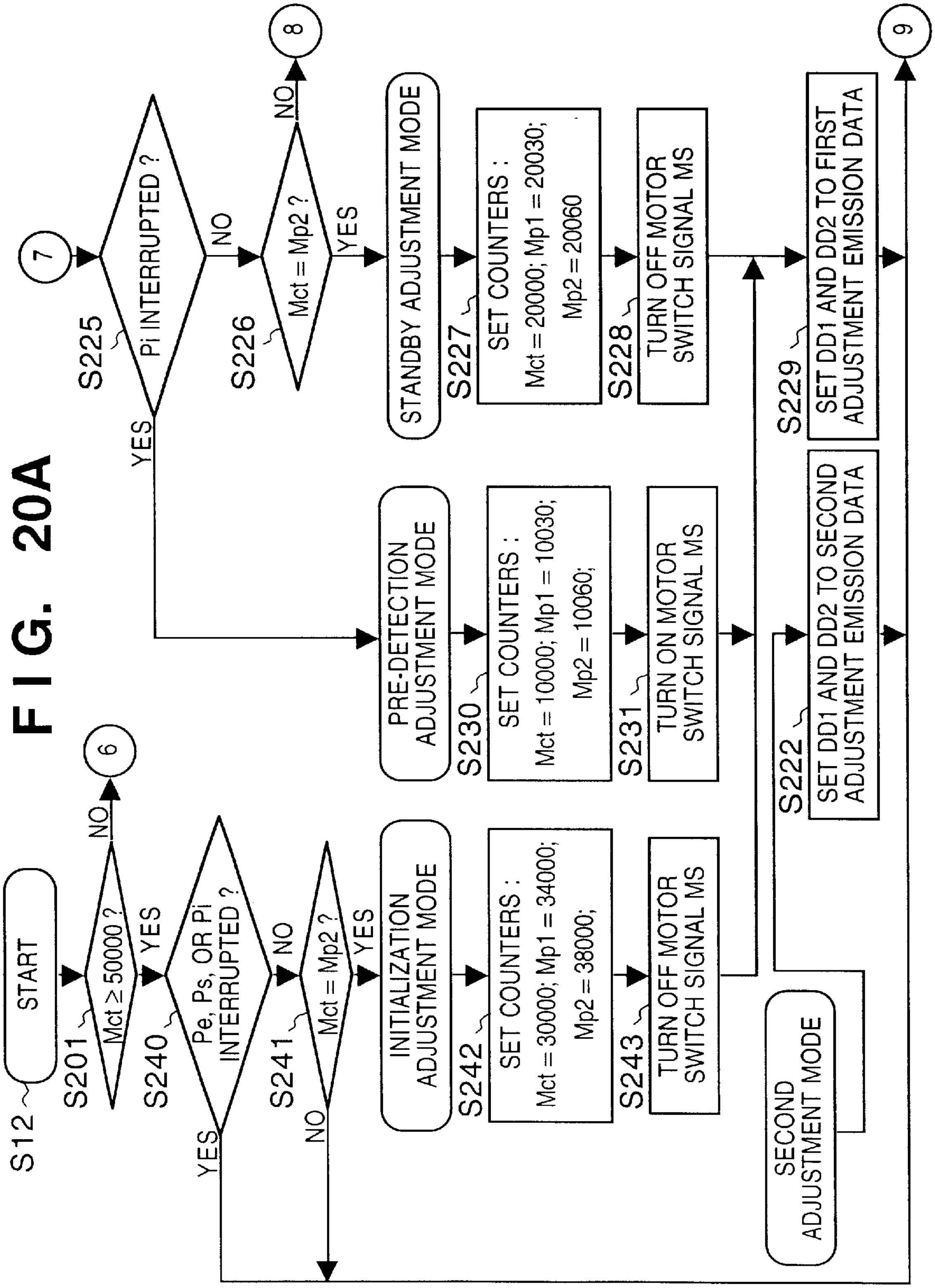
FIGS. 20A and 20B are flow charts showing the details of mode selection state check processing in the second embodiment.
Figure 20B:
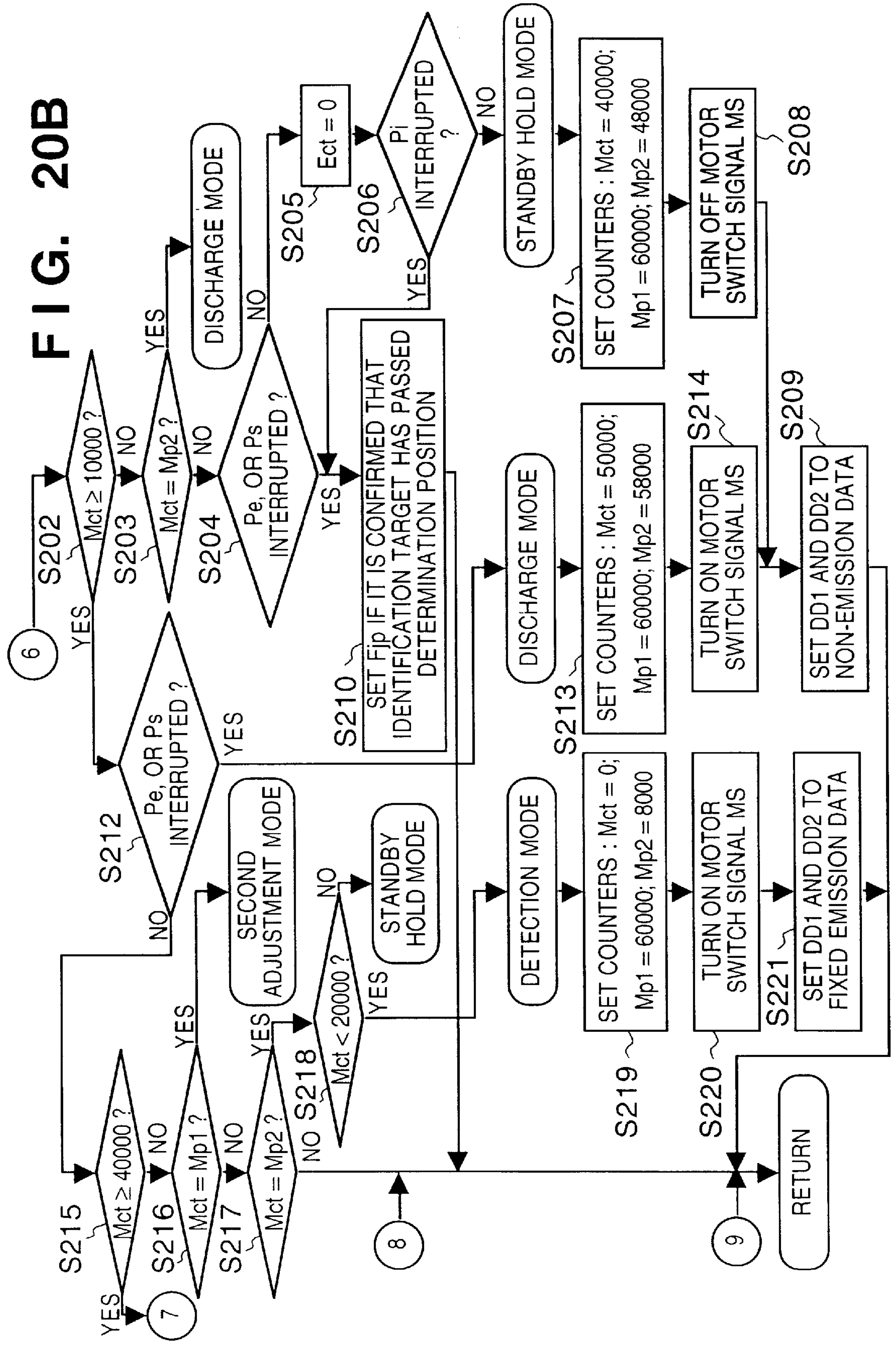

In the mode selection state check processing shown in FIGS. 20A and 20B, first of all it is checked in step S201 whether a Mct count value is equal to or larger than 50,000, i.e., the discharge mode is set. If the Mct count value is not 50,000 or more, the flow advances to step S202 to check whether the Mct count value is 10,000 or more.

If the Mct count value is not 10,000 or more, the flow advances to step S203 to check whether the Mct count value is equal to the value of preset 2 (Mp2). If the Mct count value is not equal to the value of preset 2 (Mp2), the flow advances to step S204 to check whether a Ps 33 or Pe 34 has detected an identification target 100, i.e., the identification target 100 is in the identification area.

If the Ps 33 or Pe 34 has detected the identification target 100, the flow advances to step S210 to check a Pr 35 and compare the current value with the detection value stored in the Pr 35 in the previous cycle. If there is a predetermined change, it is determined that the identification target 100 has been conveyed by a predetermined amount. In this case, the current cycle is determined as a cycle in which the position of the identification target 100 can be specified, and a confirmation signal Fjp is stored. In addition, the detection value stored in the Pr 35 in the previous cycle is updated to the detection value in the current cycle, and the flow returns.

If it is determined in step S204 that neither the Ps 33 nor the Pe 34 have detected the identification target 100, it is determined that the identification target has not reached the position of the identification start sensor (Ps) 33. The flow then advances to step S205 to reset a counter Ect for a Pr signal for specifying the position of the identification target from the identification start position to 0. In step S206, it is checked whether the input sensor Pi 32 has detected the identification target.

If it is determined in step S206 that the input sensor Pi 32 has not detected the identification target, since a detection error may be caused in the input sensor, the flow advances to the standby hold mode in step S207 and the subsequent steps. In step S207, the count value of the counter Mct is set to 40,000, and preset 1 (Mp1) and preset 2 (Mp2) are respectively set to 60,000 and 48,000. In step S208, an MS signal is turned off to inhibit a convey motor 41 from being driven. In step S209, DD1 and DD2 as driving pulse data outputs are set to non-emission data, and the flow returns.

If it is determined in step S206 that the input sensor Pi 32 has detected the identification target, it is determined that the leading edge of the identification target is located between the Pi 32 and Ps 33. Since the identification target is conveyed upon rotation of the convey motor 41 and reaches the position of the Ps 33, the flow advances to step S210. In step S210, the Pr 35 is checked, and the current values is compared with the detection value stored in the Pr 35 in the previous cycle. If there is a predetermined change, it is determined that the identification target 100 has been conveyed by a predetermined amount. In this case, the current cycle is determined as a cycle in which the position of the identification target can be specified, and the confirmation signal Fjp is stored.

In addition, the detection value stored in the Pr 35 in the previous cycle is updated to the detection value in the current cycle, and the flow returns.

If it is determined in step S202 that the Mct count value is 10,000 or more, the flow advances to step S212 to check whether the Ps 33 or Pe 34 has detected the identification target 100, i.e., the identification target 100 is in the identification area. If the Ps 33 or Pe 34 has detected the identification target 100 in such situation other than the detection mode, the flow advances to the discharge mode processing in step S213 and the subsequent steps. In the discharge mode processing, first of all in step S213 the count value of the counter Mct, preset 1 (Mp1), and preset 2 (Mp2)

are respectively set to 50,000, 60,000, and 58,000. In step S214, the MS signal is turned on to drive the convey motor 41 to convey the identification target and discharge it from the discharge position. In step S209, DD1 and DD2 as driving pulse data outputs are set to non-emission data. The flow then returns.

If it is determined in step S212 that neither the Ps 33 nor the Pe 34 have detected the identification target 100, the flow advances to step S215 to check whether the Mct count value is 40,000 or more, i.e., the standby hold mode of inhibiting the light sources from emitting light is set. If the Mct count value is not 40,000 or more, since the standby adjustment mode or detection mode is set, the flow advances to step S216 to check whether the Mct count value is equal to the value of preset 1 (Mp1). If the Mct count value is equal to the value of preset 1 (Mp1), the flow advances to the second adjustment mode in the step S222 to set adjustment emission data as the driving pulse data DD1 and DD2. The flow then returns.

If it is determined in step S216 that the Mct count value is not equal to the value of preset 1 (Mp1), the flow advances to step S217 to check whether the Mct count value is equal to the value of preset 2 (Mp2). If the Mct count value is not equal to the value of preset 2 (Mp2), it is determined that the first or second adjustment mode is not complete. The flow then returns.

When the Mct count value becomes equal to the value of the preset 2 (Mp2), the flow advances from step S217 to step S218 to check whether the Mct count value is 20,000 or less. If the Mct count value is not 20,000 or less, it is determined that the standby adjustment mode is complete, and the flow advances to the standby hold mode in step S 207 and the subsequent steps.

If it is determined in step S218 that the Mct count value is 20,000 or less, it is determined that the pre-detection adjustment mode is complete, and the flow advances to the detection mode in step S219 and the subsequent steps. In step S219, the count value of the counter Mct, preset 1 (Mp1), and preset 2 (Mp2) are respectively set to 0, 60,000, and 8,000. In step S220, the MS signal is turned on to continuously drive the convey motor 41. In step S221, DD1 and DD2 as driving pulse data outputs are set to fixed emission data. The flow then returns.

If it is determined in step S215 that the Mct count value is 40,000 or more, it indicates that the standby hold mode is being executed, and the flow advances to step S225 to check whether light to the input sensor (Pi) is interrupted and the identification target is inserted into the apparatus. If light to the input sensor (Pi) is not interrupted, the flow advances to step S226 to check whether the Mct count value is equal to preset 2 (Mp2) and the operation mode under execution is complete. If the Mct count value is not equal to preset 2 (Mp2), the flow returns.

If it is determined in step S226 that the Mct count value is equal to preset 2 (Mp2), the standby adjustment mode processing in step S227 and the subsequent steps is executed. In step S227, the Mct count value, preset 1 (Mp1), and preset 2 (Mp2) are respectively set to 20,000, 20,030, and 20,060. In step S228, the MS signal is turned off (disabled) to stop the convey motor 41. In step S229, DD1 and DD2 as driving pulse data outputs are set to adjustment emission data. The flow then returns.

If it is determined in step S225 that light to the input sensor (Pi) is interrupted and the identification target is inserted into the apparatus, the flow advances to the pre-detection adjustment mode in the step S230 and the subsequent steps, and the Mct count value, preset 1 (Mp1), and preset 2 (Mp2) are respectively set to 10,000, 10,030, and 10,060. In step S231, the MS signal is turned on to drive the convey motor 41. In step S229, DD1 and DD2 as driving pulse data outputs are set to first adjustment emission data. The flow then returns.

If it is determined in step S201 that the Mct count value is 50,000 or more (the discharge mode in the second embodiment), the flow advances to step S240 to check whether the Pi 32, Ps 33, or Pe 34 has detected the identification target 100, i.e., the identification target 100 is located in the apparatus. If the Pi 32, Ps 33, or Pe 34 has detected the identification target 100, the flow returns.

If it is determined in step S240 that none of the Pi 32, Ps 33, and Pe 34 have detected the identification target 100, the flow advances to step S241 to check whether the Mct count value is equal to preset 2 (Mp2) and the discharge mode under execution is complete. If the Mct count value is not equal to preset 2 (Mp2), the flow returns.

If it is determined in step S241 that the Mct count value is equal to preset 2 (Mp2), the initialization adjustment mode processing in step S242 and the subsequent steps is executed. In step S242, the Mct count value, preset 1 (Mp1), and preset 2 (Mp2) are respectively set to 30,000, 34,000, and 38,000. In step S243, the MS signal is turned off (disabled) to stop the convey motor 41. In step S229, DD1 and DD2 as driving pulse data outputs are set to adjustment emission data. The flow then returns.

Figure 21:
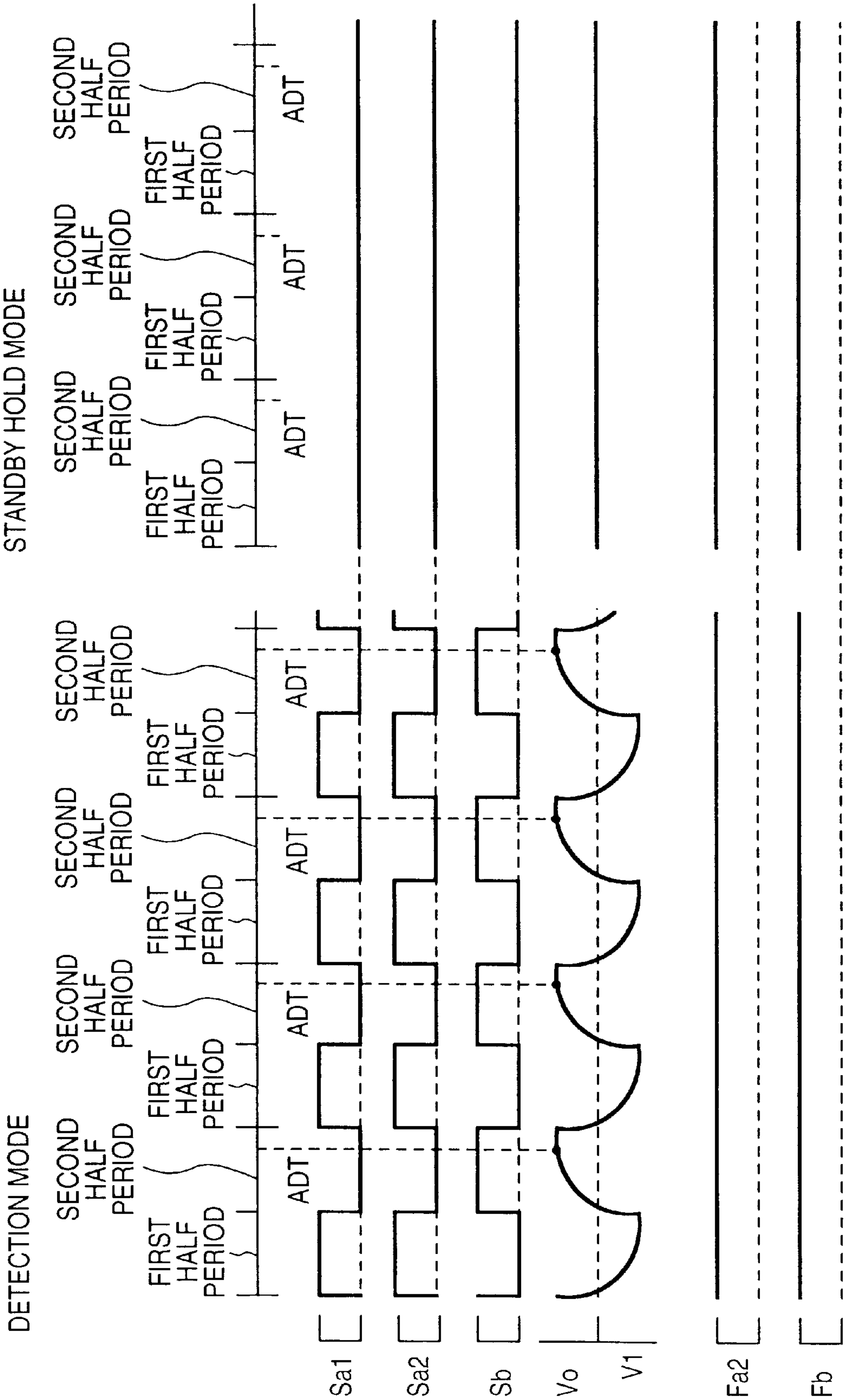
FIG. 21 is a timing chart showing examples of driving control signals for light sources A1, A2, and B and detection signal timings in the detection mode and standby hold mode according to the second embodiment.
Figure 22:
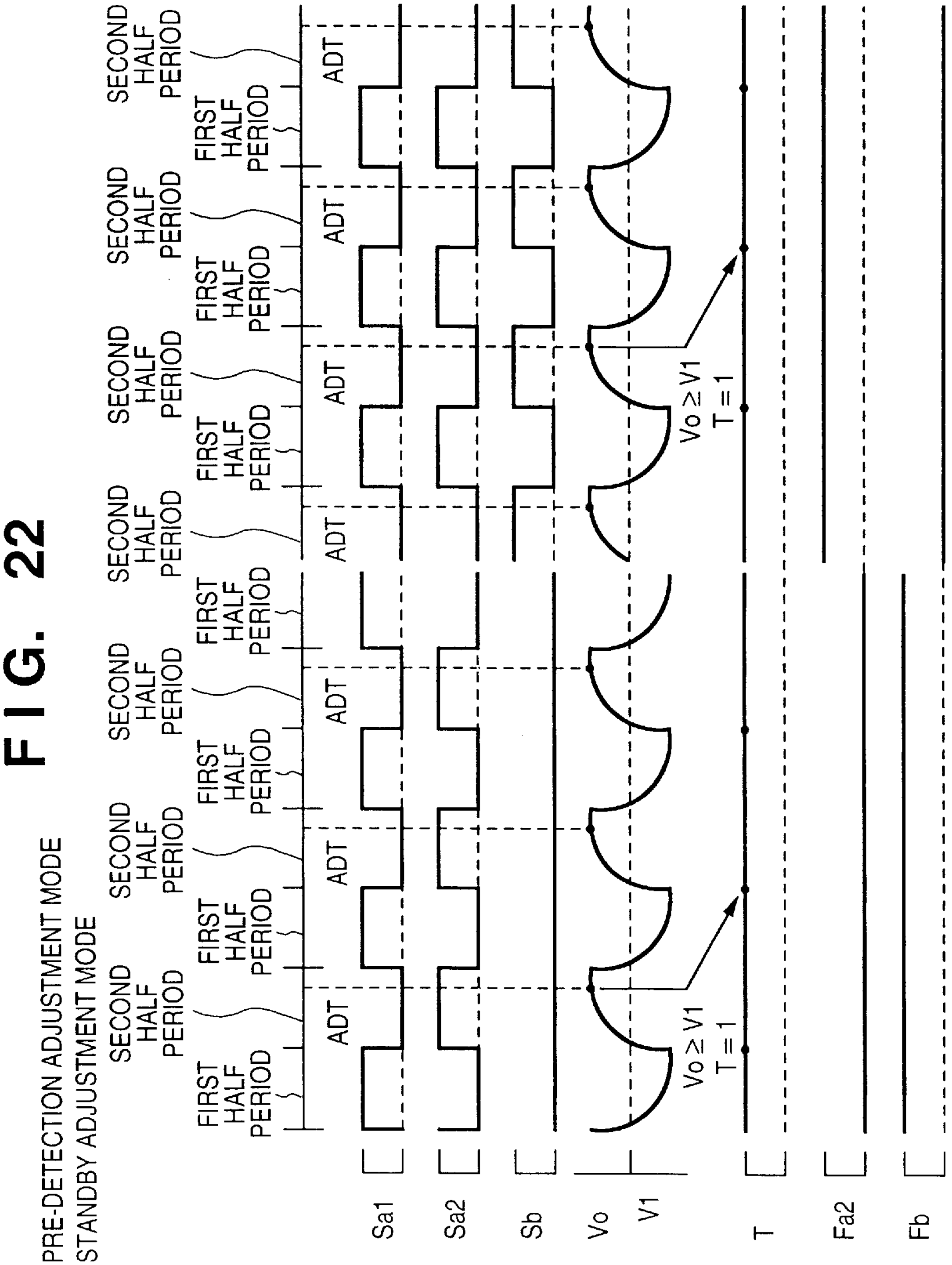
FIG. 22 is a timing chart showing examples of driving control signals for the light sources A1, A2, and B and detection signal timings in the standby adjustment mode and pre-detection mode according to the second embodiment.
Figure 23:
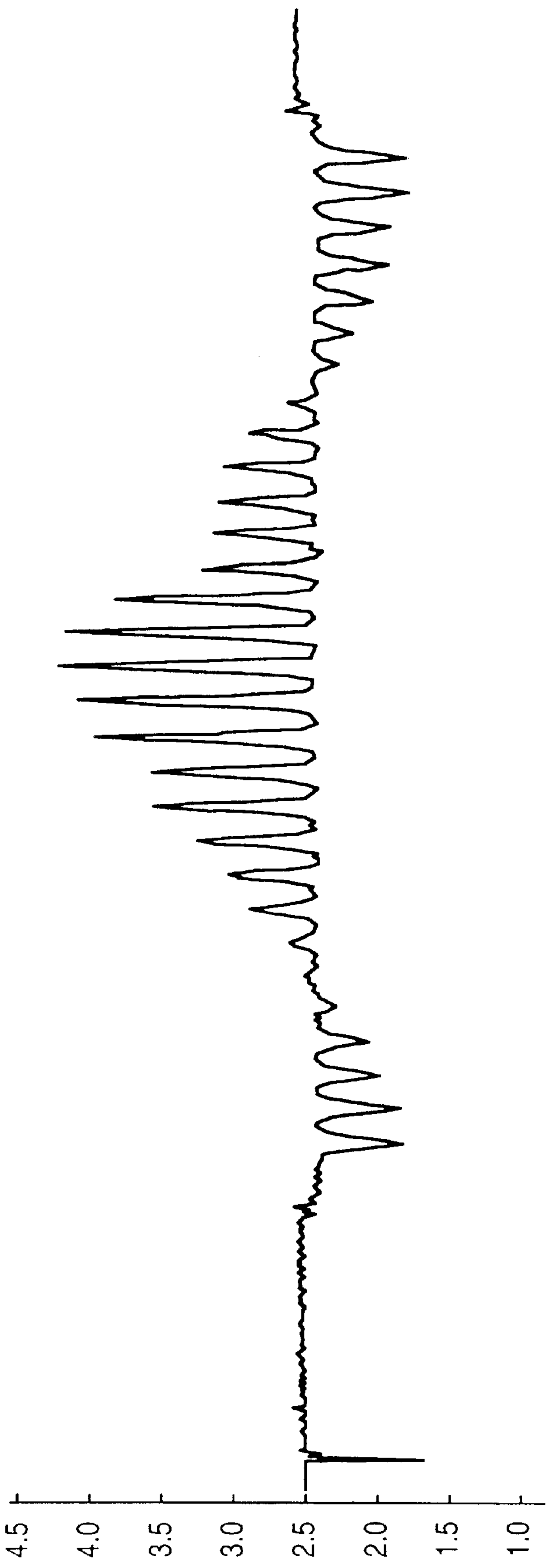
FIG. 23 is a graph showing the sampling result obtained with respect to a predetermined identification target in the second embodiment.

FIG. 21 shows examples of driving control signals for the light sources A1, A2, and B123 and detection signal timings in the detection mode and standby hold mode under the control described above. FIG. 22 shows examples of driving control signals for the light sources A1, A2, and B123 and detection signal timings in the standby adjustment mode and pre-detection adjustment mode. FIG. 23 shows the sampling result obtained by performing sampling operation in this manner with respect to a predetermined identification target in the second embodiment. In the case shown in FIG. 23, a green LED, infrared LED, and red LED are respectively used as the light source A1, light source A2, and light source B.

In practice, a proper color chart is used as the identification target in FIG. 23.

As described above, according to the second embodiment, each of the standby adjustment mode and pre-detection adjustment mode is divided into two parts. In the first half part, the light sources A1 and A2 are adjusted. In the second half part, the light sources A1 and A2 and light source B are adjusted (e.g., 30 times+30 times; a total of 15 msec).

[Third Embodiment]

According to the above embodiment, as examples of light sources, red and green light-emitting diodes or a red light-emitting diode, infrared light-emitting diode, and green light-emitting diode are installed in one place, and light beams are received by one photoelectric converter. However, the present invention is not limited to this, and may be constituted by a plurality of combinations of detection systems (a light source, light source driving circuit, photoelectric converter, and light-receiving amplifier unit).

The third embodiment may have the same basic arrangement as that of the first embodiment. In this case, blinking of each light source and fixing of light intensity may be concurrently controlled at the same timing, and signal data processing such as sampling and light intensity adjustment may be performed in light source driving cycles in a time-divisional manner.

Figure 24:
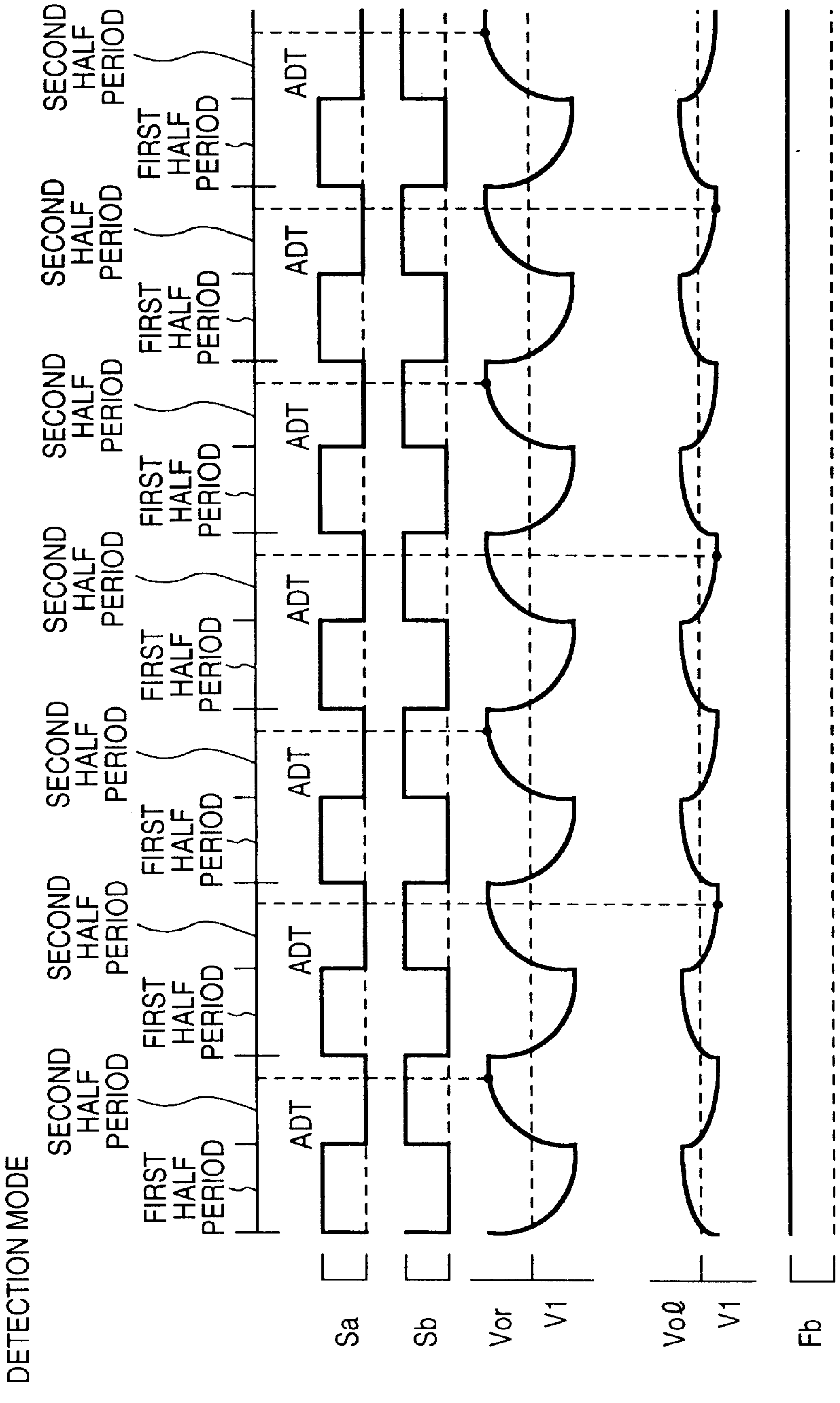
FIG. 24 is a timing chart showing examples of driving control signals for light sources A1, A2, and B and detection signal timings in the detection mode according to the third embodiment.
Figure 25:
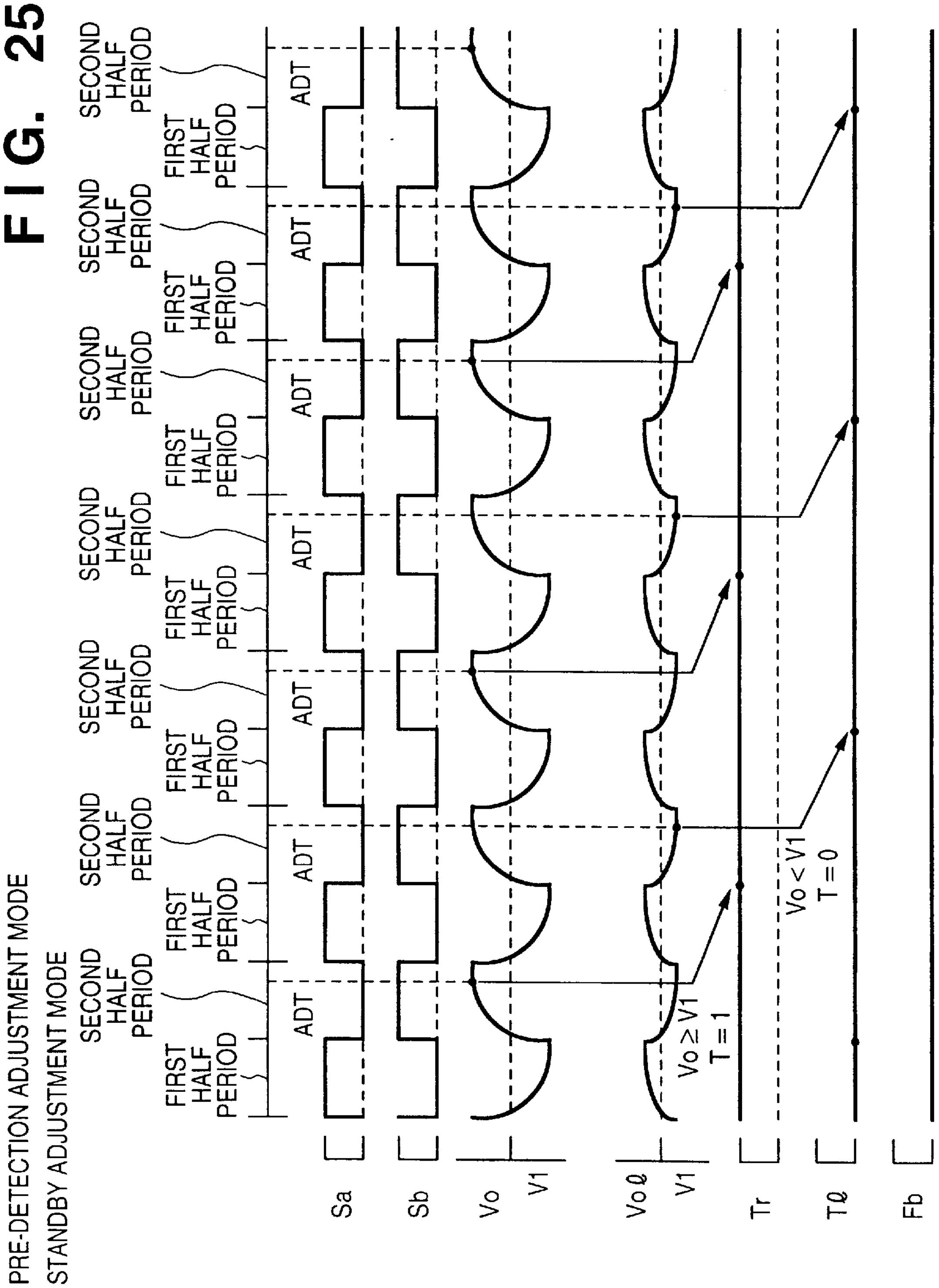
FIG. 25 is a timing chart showing examples of driving control signals for light sources A1, A2, and B and detection signal timings in the standby adjustment mode and pre-detection adjustment mode according to the third embodiment.

The third embodiment is constituted by the two detection systems in the first embodiment. FIG. 24 shows examples of driving control signals for the light sources and detection signal timings in the detection mode according to the third embodiment. FIG. 25 shows examples of driving control signals for the light sources and detection signal timings in the standby adjustment mode and pre-detection adjustment mode.

[Other Embodiment]

In the above description, the duty ratio of driving pulses for the light sources is nearly 50%. However, the present invention is not limited to a duty ratio of 50%, and an arbitrary duty ratio can be set.

As has been described above, according to the present invention, there is provided a light-transmitting object identifying apparatus which can automatically solve problems associated with variations in performance of each constituent member of a mechanism for detecting an identification object, changes in performance over time, and changes in performance due to environments with a simple arrangement, can be easily manufactured and adjusted, and has high reliability. In addition, since the difference in color taste between an authentic object and an identification target can be expressed as a single signal with respect to the identification target, reliable authentication can be performed using a simple algorithm.

Furthermore, since the light sources do not emit light unnecessarily, the reliability of each light source can be greatly improved.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for identifying a light-transmitting object, the apparatus comprising:

a light-emitting device having light-emitting elements for emitting light beams having at least two different wavelengths;

a light receiver for converting light beams received from said light-emitting device into corresponding electrical signals;

an emission controller for activating and deactivating each of said light-emitting elements independently;

a detector for detecting arrival of an identification target at a position between said light-emitting device and said light receiver;

an adjustment unit for adjusting an intensity of light beam emitted from at least one of said light-emitting elements such that a difference between intensities of light beams emitted from the respective light-emitting elements falls within a predetermined range;

a fixing unit for fixing an adjustment state of said adjustment unit;

a mode controller for controlling said emission controller to alternately activate said light-emitting elements and said adjustment unit to be activated, in a first mode, and said emission controller to deactivate all of said light-emitting elements and said adjustment unit to be deactivated, in a second mode, and for repeating a set of said first mode and said second mode while said detector does not detect the arrival of the identification target; and an identifying unit for identifying the identification target in response to the detection of the arrival of the identification target by said detector, based on electrical signals converted by said light receiver from the emitted light beams which are emitted from said light-emitting elements according to the fixed adjustment state and transmitted through the identification target.

2. The apparatus according to claim 1, the apparatus further comprising an insertion detector for detecting insertion of the identification target into the apparatus, wherein when said insertion detector detects insertion of the identification target, light intensity adjustment is performed and said fixing unit fixes the adjustment state.

3. The apparatus according to claim 1, wherein said light-emitting elements of said light-emitting device comprise light-emitting diodes, said light-emitting diodes including a green light-emitting diode and a red light-emitting diode.

4. The apparatus according to claim 1, wherein said light-emitting elements of said light-emitting device comprise light-emitting diodes said light-emitting diodes including a composite light source having a green light-emitting diode and a red light-emitting diode.

5. The apparatus according to claim 1, wherein said light-emitting elements of said light-emitting device comprise light-emitting diodes, said light-emitting diodes including a red light-emitting diode and a composite light source having a green light-emitting diode and an infrared light-emitting diode.

6. A method for identifying a light-transmitting object in an apparatus for identifying a light-transmitting object, the apparatus including a light-emitting device having light-emitting elements for emitting light beams having at least two different wavelengths, a light-receiver for converting light beams received from said light-emitting device into corresponding electrical signals, an emission controller for activating and deactivating each of said light-emitting elements independently and, a detector for detecting arrival of an identification target at a position between said light-emitting device and said light-receiver, said method comprising the steps of:

adjusting an intensity of light beam emitted from at least one of said light-emitting elements such that a difference between intensities of light emitted from the respective light-emitting elements falls within a predetermined range;

fixing an adjustment state in said adjustment step;

controlling said emission controller to alternately activate said light-emitting elements and said adjustment step to be performed, in a first mode, and said emission controller to deactivate all of said light-emitting elements and said adjustment step not to be preformed, in a second mode, and for repeating a set of said first mode and said second mode while said detector does not detect the arrival of the identification target, and identifying the identification target in response to the detection of the arrival of the identification target by said detector, based on electrical signals converted by said light receiver from the emitted light beams which are emitted from said light-emitting elements according to the fixed adjustment state and transmitted through the identification target.

* * * * *